United States Patent
Li et al.

(10) Patent No.: US 11,084,136 B2
(45) Date of Patent: Aug. 10, 2021

(54) MILLING SYSTEM AND METHOD UNDER DIFFERENT LUBRICATION CONDITIONS

(71) Applicants: QINGDAO UNIVERSITY OF TECHNOLOGY, Qingdao (CN); CHONGQING UNIVERSITY, Chongqing (CN); SHANGHAI JINZHAO ENERGY SAVING TECHNOLOGY CO., LTD, Shanghai (CN)

(72) Inventors: Changhe Li, Qingdao (CN); Qingan Yin, Qingdao (CN); Huajun Cao, Qingdao (CN); Yonghong Liu, Qingdao (CN); Wenfeng Ding, Qingdao (CN); Naiqing Zhang, Qingdao (CN); Lan Dong, Qingdao (CN); Zhenjing Duan, Qingdao (CN); Yanbin Zhang, Qingdao (CN); Xiufang Bai, Qingdao (CN); Menghua Sui, Qingdao (CN); Wentao Wu, Qingdao (CN); Gao Teng, Qingdao (CN); Min Yang, Qingdao (CN); Dongzhou Jia, Qingdao (CN); Runze Li, Qingdao (CN); Yali Hou, Qingdao (CN)

(73) Assignees: QINGDAO UNIVERSITY OF TECHNOLOGY, Qingdao (CN); CHONGQING UNIVERSITY, Chongqing (CN); SHANGHAI JINZHAO ENERGY SAVING TECHNOLOGY CO., LTD, Shanghai (CN)

( * ) Notice: Subject to any disclaimer, the term of this patent is extended or adjusted under 35 U.S.C. 154(b) by 47 days.

(21) Appl. No.: 16/683,605

(22) Filed: Nov. 14, 2019

(65) Prior Publication Data
US 2020/0164476 A1  May 28, 2020

(30) Foreign Application Priority Data

Nov. 22, 2018 (CN) .......................... 201811401223.3

(51) Int. Cl.
*B23Q 3/157* (2006.01)
*B23Q 11/10* (2006.01)
(Continued)

(52) U.S. Cl.
CPC ............ *B23Q 3/15722* (2016.11); *B23C 1/06* (2013.01); *B23Q 3/1554* (2013.01); *B23Q 11/10* (2013.01);
(Continued)

(58) Field of Classification Search
CPC .............. B23Q 3/15713; B23Q 3/1572; B23Q 3/15722; B23Q 2003/155414;
(Continued)

(56) References Cited

U.S. PATENT DOCUMENTS

| 3,300,856 | A | * | 1/1967 | Daugherty | ......... B23Q 3/15526 483/40 |
| 3,709,012 | A | * | 1/1973 | Larsonneor | ............. B21B 27/10 72/12.5 |

(Continued)

FOREIGN PATENT DOCUMENTS

| CN | 202952116 U | 5/2013 |
| CN | 208163240 U | 11/2018 |

(Continued)

*Primary Examiner* — Erica E Cadugan
*Assistant Examiner* — Michael Vitale
(74) *Attorney, Agent, or Firm* — True Shepherd, LLC; Andrew C. Cheng

(57) ABSTRACT

The disclosure provides a method and system for milling injected cutting fluid under different working conditions. By analyzing influence of airflow fields in a milling area under different working conditions on injection of cutting fluid, an influence rule of a helical angle and a rotation speed of a (Continued)

cutter on the flow field is quantitatively analyzed, an optimal target distance of a nozzle, an angle between the nozzle and a milling cutter feeding direction and an angle between the nozzle and the surface of a workpiece are comprehensively determined, the nozzle is set according to a determined setting manner, and lubricating oil is sprayed to the milling area by utilizing the nozzle.

2 Claims, 14 Drawing Sheets

(51) Int. Cl.
*B23C 1/06* (2006.01)
*B23Q 3/155* (2006.01)

(52) U.S. Cl.
CPC .............. *B23C 2250/12* (2013.01); *B23Q 2003/155418* (2016.11); *B23Q 2003/155428* (2016.11)

(58) Field of Classification Search
CPC ....... B23Q 2003/155418; B23Q 2003/155425; B23Q 2003/155428; B23Q 2003/155435; B23Q 2003/155439; B23Q 11/10–11/148; Y10T 408/46; Y10T 409/303976; Y10T 409/304032; Y10T 483/1748; Y10T 483/1752; Y10T 483/1755; Y10T 483/1767; Y10T 483/1769; Y10T 483/1771
USPC .......... 408/61; 409/135, 136; 483/36, 38, 39, 483/44, 45, 46
See application file for complete search history.

(56) References Cited

U.S. PATENT DOCUMENTS

| | | | | |
|---|---|---|---|---|
| 4,050,146 | A * | 9/1977 | Geiger | B23B 47/30 483/32 |
| 5,444,634 | A * | 8/1995 | Goldman | G05B 19/182 184/6.1 |
| 6,305,183 | B1 * | 10/2001 | Mukai | B23Q 11/122 451/450 |
| 6,321,860 | B1 | 11/2001 | Reddoch | |
| 6,772,042 | B1 * | 8/2004 | Warren | B23Q 11/1038 408/61 |
| 2002/0146297 | A1 * | 10/2002 | Curtis | B23Q 11/1084 409/132 |
| 2007/0016325 | A1 * | 1/2007 | Esterling | B23Q 17/0961 700/175 |
| 2007/0289815 | A1 * | 12/2007 | Frowiss | B23Q 11/1084 184/6 |
| 2016/0184951 | A1 | 6/2016 | Kurokawa | |

FOREIGN PATENT DOCUMENTS

| | | | | |
|---|---|---|---|---|
| FR | 2483291 | A1 * | 12/1981 | ............ B23Q 3/1554 |
| JP | 55037215 | A * | 3/1980 | ......... B23Q 3/15773 |
| JP | 07276184 | A * | 10/1995 | |
| JP | 08252745 | A * | 10/1996 | |
| JP | 2000052185 | A * | 2/2000 | ............ B23Q 11/10 |
| WO | WO-2017049763 | A1 * | 3/2017 | ............ B24B 19/22 |

* cited by examiner

US 11,084,136 B2

MILLING SYSTEM AND METHOD UNDER DIFFERENT LUBRICATION CONDITIONS

CROSS-REFERENCE TO RELATED APPLICATIONS

This application claims priority to Chinese Patent Application No. 201811401223.3 with a filing date of Nov. 22, 2018. The content of the aforementioned applications, including any intervening amendments thereto, are incorporated herein by reference.

TECHNICAL FIELD

The disclosure relates to a method and system for milling injected cutting fluid under different working conditions.

BACKGROUND OF THE PRESENT INVENTION

The statement of this part only provides background technical information related to the present disclosure, and does not necessarily constitute the existing technology.

At present, milling is the most commonly used cutting in mechanical manufacturing industry, which is high in processing and production efficiency, wide in processing target distance and high in processing precision. However, when in milling, the contact time between a cutter and a workpiece is extremely short, the sharp friction occurs between the rake face of the cutter and the chips and between the flank face of the cutter and the workpiece so that a large number of cutting heat is generated, the cutter is sharply abraded, cutter failure is too fast, and the improvement of the processing efficiency is seriously restricted. Therefore, cooling liquid is very important in processing, which has the functions of lubrication, cooling, cleaning, rust prevention and the like.

The conventional milling causes huge damage on environment and workers due to use of a large amount of cutting fluid. In order to protect the environment and reduce the cost, micro lubrication and nano fluid micro lubrication technologies have more advantages. However, this fluid supply method has certain disadvantages that the air has viscidity, the milling cutter rotating at high speed can affect the hydrodynamic characteristics of an air flow field close to the milling cutter, the air around the milling cutter is originally static, but the milling cutter rotating at high speed can cause air to flow, and the closer the air is to the cutting edge, the higher the flow speed of air is, thus forming a closed "ring-shaped" area around the milling cutter, which hinders the incoming of the cutting fluid so that the cutting fluid cannot enter the milling cutter/workpiece interface to cause machining burns. Therefore, adoption of an appropriate cutting fluid injection method and increase of the proportion of the cutting fluid entering the processing area have extremely important effects on boosting the cooling and lubrication effect and improving the surface quality of the workpiece.

However, at present, there are no good research achievements in the aspect of cutting fluid injection during milling.

SUMMARY OF PRESENT INVENTION

In order to solve the above problems, the disclosure provides a method and system for milling injected cutting fluid under different working conditions. In the disclosure, a milling cutter is used to mill a workpiece, a force measurement instrument is used to measure a milling force, a cutter change system is used to achieve the change of the cutters, a magazine system is used to achieve the storage of the cutters and a lubricating system is used to provide lubricating oil to a milling interface. The position of a nozzle is selected according to airflow fields under different working conditions. The position of the nozzle is located within an air barrier and in incoming flow, and is not affected by breaking through the air barrier, thereby saving the useless work of the fluid supply system. Meanwhile, the incoming flow can assist the cutting fluid to more efficiently enter the cutting area.

According to some embodiments, the disclosure adopts the following technical solution:

Provided is a method for milling injected cutting fluid under different working conditions, comprising the following steps:

analyzing influence of airflow fields in a milling area under different working conditions on injection of cutting fluid, quantitatively analyzing an influence rule of a helical angle and a rotation speed of a cutter on the flow field to determine an optimal target distance of a nozzle, an angle between the nozzle and the milling cutter feeding direction and an angle between the nozzle and the surface of a workpiece, arranging the nozzle according to a determined setting manner, and spraying lubricating oil to the milling area by utilizing the nozzle.

As further definition, when the nozzle is along circumferential flow and in incoming flow, the flow field plays a role in auxiliary transportation of the injection of the cutting fluid, thereby increasing the efficiency utilization rate of the cutting fluid.

As further definition, among nozzle position influence factors, the target distance can generate the greatest influence, the angle between the nozzle and the milling cutter feeding direction can generate the second influence, and the angle between the nozzle and the surface of the workpiece can generate the least influence.

As further definition, when the jet flow direction of the nozzle is tangent to the flow line of the air flow field, the cutting fluid is injected along the direction of the airflow, the air flow field plays a role in auxiliary transportation of the injection of the cutting fluid, the angle of the jet flow of the nozzle at this moment is an optimal jet flow angle.

As further definition, the optimal target distance of the nozzle is within the air barrier.

As further definition, the optimal position of the nozzle varies with change in the helical angle and the rotation speed of the milling cutter, the angle between the nozzle and the milling cutter feeding direction is related to the helical angle of the milling cutter, when this angle is the same as the helical angle, it is the most conducive to the incoming of the cutting fluid; the target distance of the nozzle is related to the rotation speed of the milling cutter, and the diameter of the milling cutter does not affect the position of the nozzle.

As more further definition, when the rotation speeds of the milling cutter are 600 r/min and 1200 r/min, the maximal value of the target distance is within 30 mm; when the rotation speeds of the milling cutter are 1800 r/min and 2400 r/min, the maximal value of the target distance is within 20 mm.

As further definition, the rotation speed of the milling cutter does not affect the angle between the nozzle and the milling cutter feeding direction, but the optimal target distance decreases with increase of the rotation speed of the milling cutter.

As further definition, on the basis that the position of the nozzle is ensured to be in the incoming flow of the airflow field, improvement of the rotation speed of the milling cutter or/and increase of the diameter of the milling cutter can promote the transportation effect of the airflow field on the cutting fluid and improve the effective utilization rate of the cutting fluid.

Provided is a system for milling injected cutting fluid under different working conditions, comprising a lubricating system, a magazine system, a cutter change system, a cutting system and a force measurement system, wherein:

the magazine system comprises a rotatable rotation shaft on which a plurality of cutter assemblies are circumferentially distributed, each cutter assembly is provided with a mandrel and a cutter connected with the lower end of the mandrel, the helical angles of various cutters are not identical, and the cutter adapted to the working condition corresponds to the cutter change system through the rotation of the rotation shaft;

the cutter change system comprises two mechanical arms whose directions are opposite, the rotation shaft is arranged in the middle of the two mechanical arms, conversion of the positions of the two mechanical arms is achieved by controlling the rotation of the rotation shaft and then the change between the principal axis cutter of the cutting system and the cutter of the magazine system is realized;

the cutting system comprises the mandrel on which the principal axis cutter is arranged, the rotation of the principal axis cutter is driven by controlling the rotation of the mandrel, thereby achieve cutting;

the force measurement system is arranged at the lower end of the cutting system, when a cutting forced is applied to a workpiece fixed on the force measurement system, the cutting force applied to the workpiece is measured, and the cutters having different helical angles are selected for milling according to processing parameters;

the lubricating system provides lubricating oil for the cutting system, the power source of the lubricating system is a high-pressure gas, the input frequency and quantity of the high-pressure gas are respectively controlled by a frequency generator and a control valve, the quantity of lubricating oil in a lubricating pump is indirectly adjusted, the lubricating oil provided by the lubricating system is sprayed to the milling area acted by the cutting system respectively through a pipeline, a nozzle pipe and a nozzle, and the position of the nozzle is adjusted depending on difference in flow fields of the milling areas and helical angles and rotation speeds of the cutters under different working conditions.

As further definition, the lubricating system comprises a gas inlet interface, a gas source processor, a lubricating pump, a nozzle and connection pipelines, and control valves are arranged on various connection pipelines, the gas inlet interface is fixed on the gas source processor, the high-pressure gas enters the gas source processor via the gas source processor for filtration to provide the high-pressure gas for the lubricating system, the gas source processor is connected to a solenoid valve through a dual-direction joint to control the incoming of the high-pressure gas, the outlet of the solenoid valve is connected with a tee, the high-pressure gas enters the frequency generator via one outlet pipeline of the tee, the input frequency of the high-pressure gas is controlled through the frequency generator, the high-pressure gas enters the lubricating pump through the pipeline after coming out of the frequency generator, and the output joint of the lubricating pump is connected with the joint of the nozzle to provide the lubricating oil for the cutting system; the high-pressure gas enters the lubricating pump through another outlet pipeline of the tee, one end of the joint of an oil cup is in threaded connection, the other end is in threaded connection with a lubricating pump fixing cover, the lubricating pump fixing cover is connected with the lubricating pump, the lubricating pump fixing cover is fixed on a box body, the quantity of the high-pressure gas is adjusted by adjusting a gas quantity adjustment knob, and the quantity of the lubricating oil is adjusted by adjusting an oil quantity adjustment knob.

As further definition, the force measurement system comprises a workbench, a workpiece holder and a measurement element, the workbench is arranged right under the cutting system, the workpiece holder is fixed on the workbench, complete positioning is achieved through the workpiece holder and the workbench by utilizing the workpiece' own freedom, the measurement element collects the cutting force applied to the workpiece, a measurement signal is amplified by an amplifier to be transferred to an information collection instrument, and then conducted to a computer via a wire to display the cutting force;

the workpiece holder comprises clamping elements in X-Y-Z-axis three directions, the clamping element in the X-axis direction comprises a plurality of positioning screws, the clamping element in the Y-axis direction comprises fastening screws and positioning blocks, one face of the positioning block contacts with the side of the workpiece, one face contacts with the screws, and the positioning screw is tightly screwed so that the positioning block is clamped in the X direction of the workpiece; the clamping element in the Z-axis direction comprises a plurality of pressing plates for clamping, each pressing plate is a self-adjusting pressing plate, and the adjustment of equipment is achieved according to the size of the workpiece through clamping elements in X-Y-Z-axis three directions, thereby meeting the requirement on change in the size of the workpiece.

As compared with the prior art, the disclosure has the beneficial effects:

The disclosure provides a method for determining the optimal position of the nozzle under different working conditions. This position can avoid energy consumption for breaking through the gas barrier in the process of supplying the cutting fluid, thereby saving the useless work energy of the fluid supply system. At the same time, under the transportation of the pressure and the incoming flow, the cutting fluid can obtain more power and energy in the airflow field, thereby avoiding the return flow and increasing the flux of the cutting fluid passing through the cutter/workpiece interface.

The discloses provides a milling system which can realize different working conditions, and can realize dry milling and milling under working conditions of pouring lubrication, micro lubrication and nano fluid micro lubrication, and meanwhile different cutters can be selected according to different cutting parameters.

DESCRIPTION OF THE DRAWINGS

The description and drawings constituting one part of this application are used to provide further understanding of this application. The schematic embodiments and descriptions of this application are intended to explain this application, but not constitute an improper limitation of this application.

Figure 1:
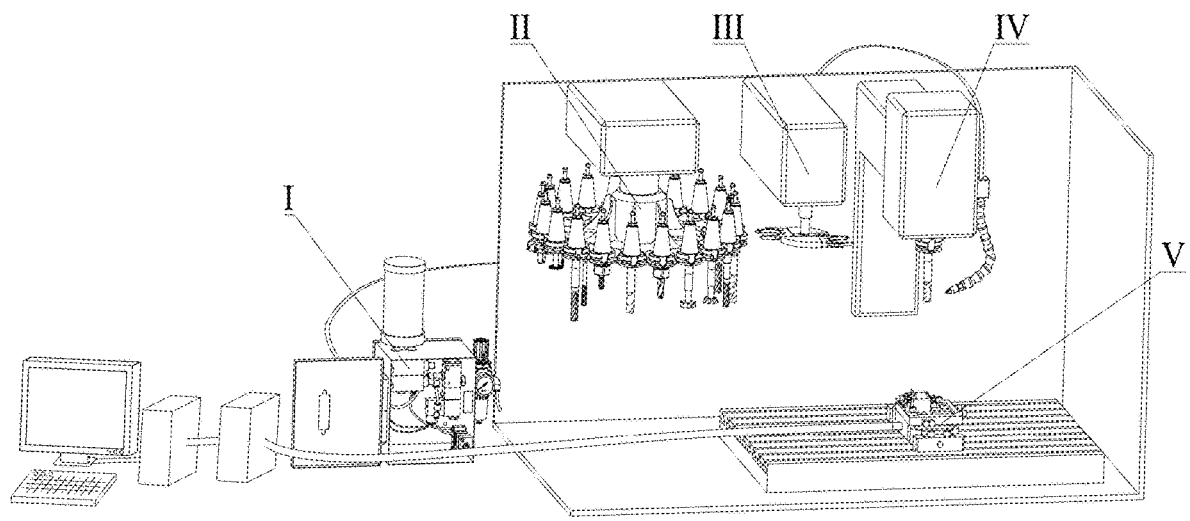
FIG. 1 is a shaft side view of a method and experiment system for milling injected cutting fluid under different working conditions.

Where, lubricating system I, magazine system II, cutter change system m, cutting system IV, force measurement system V, box body I-1, oil cup joint I-2, oil cup I-3, fastening screw I-4, gasket I-5, fastening screw I-6, lubricating pump fixing cover I-7, precise micro lubricating pump I-8, gas quantity regulating knob I-9, tee I-10, solenoid valve I-11, gas source processor I-12, gas inlet interface I-13, dual-direction joint I-14, frequency generator I-15, pipeline I-16, pipeline I-17, pipeline I-18, oil quantity resulting knob I-19, and oil pump outlet joint I-20

Motor case II-1, mandrel II-2, cutter head II-3, and milling cutter II-4.

Motor case III-1, mechanical arm III-2, mechanical arm III-3.

Motor case IV-1, pipeline IV-2, screw IV-3, gasket IV-4, magnetic sucking disc IV-5, nozzle interface IV-6, lubricating pump fixing cover IV-7, mandrel IV-8, nozzle IV-9, milling cutter IV-10, workbench IV-1.

Computer V-1, wire V-2, force information collection instrument V-3, amplifier V-4, pressing plate V-5, cylindrical gasket V-6, pressing plate nut V-7, pressing plate screw V-8, workpiece V-9, flat plate screw V-10, small pressing plate screw V-11, positioning screw V-12, workpiece holder V-13, positioning block V-14, dynamometer V-15, screw V-16, holder screw V-17, flat plate V-18, flat plate V-19.

Rear angle II-4-1, rear cutter face II-4-2, front angle II-4-3, chip removal groove II-4-4, front cutter face II-4-5.

DETAILED DESCRIPTION OF PREFERRED EMBODIMENTS

The disclosure will be further described in combination with drawings and embodiments.

It should be noted that the following descriptions are all illustrative, and intended to provide further description for this application. Unless indicated otherwise, all the technical terms and scientific terms used in this text have the same meaning as that understood by those of ordinary skill in the art.

It is noted that the terms used herein are only for describing specific embodiments and are not intended to limit exemplary embodiments according to this application. As used herein, the singular is intended to include the plural, unless the context otherwise expressly indicates. In addition, it is also understood that when the terms "include" and/or "comprise" are used in this description, they indicate that there are features, steps, operations, devices, components and/or their combinations.

In the disclosure, the orientation or position relationship indicated by terms such as "up", "down", "left", "right", "front", "back", "vertical", "horizontal", "side", "bottom" is the orientation or position relationship show based on drawings, they are relative terms only for facilitating description of the structural relationship of each component or element of the disclosure, but not specifically refer to any one component or element of the disclosure, which cannot be understood as a limitation of the present disclosure.

In the disclosure, terms such as "fixed connection", "linkage" and "connection" should be understood in a broad sense, indicating that components or elements can be fixedly connected, integrally connected or detachably connected; directly connected or indirectly connected through an intermediate medium. For the relevant scientific research or technical personnel in the art, the specific meaning of the above terms in the disclosure can be determined according to the specific situation, but cannot be understood as limiting the disclosure.

FIG. 1 is a shaft side view of a method and experiment system for milling cutting fluid under different working conditions.

As shown in FIG. 1, the disclosure comprises five systems, namely, a lubricating system I, a magazine system II, a cutter change system III, a cutting system IV and a force measurement system V. The lubricating system I mainly provides milling lubricating oil for cooling and lubricating, the magazine system II realizes storage of cutters, the cutter change system III realizes use of cutters, the cutting system IV is used for milling workpieces, and the force measurement system V is mainly used for measuring a milling force when the workpiece is milled.

Figure 2:
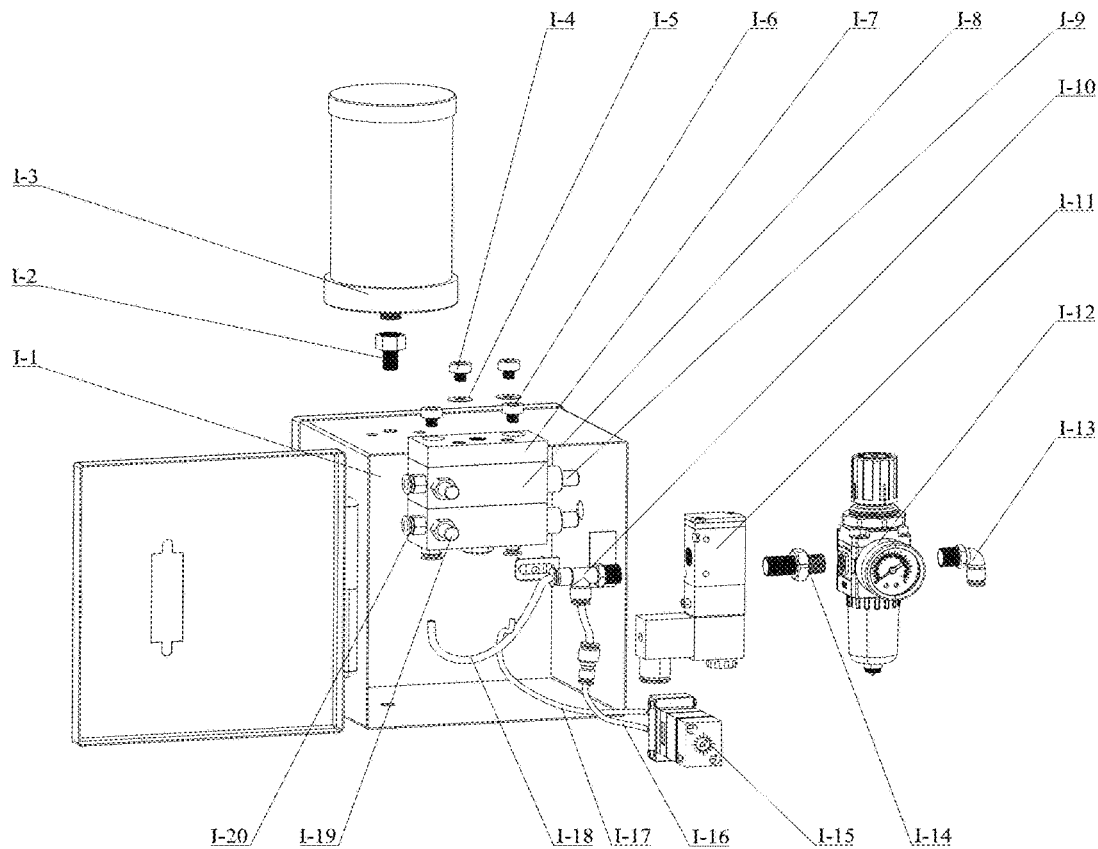
FIG. 2 is an exploded assembly view of a lubricating system.

FIG. 2 is an exploded assembly view of a lubricating system.

As shown in FIG. 2, the lubricating system includes a box body I-1, an oil cup joint I-2, an oil cup I-3, a fastening screw I-4, gaskets I-5, fastening screws I-6, a lubricating pump fixing cover I-7, a precise micro lubricating pump I-8, a gas quantity regulating knob I-9, a tee I-10, a solenoid valve I-11, a gas source processor I-12, a gas inlet interface I-13, a dual-direction joint I-14, a frequency generator I-15, a pipeline I-16, a pipeline I-17, a pipeline I-18, an oil quantity resulting knob I-19 and an oil pump outlet joint I-20.

The gas inlet interface I-13 is fixed on the gas source processor I-12, a high-pressure gas enters the gas source processor I-12 via the gas inlet interface I-13 to be filtered to provide the high-pressure gas for the lubricating system, the gas source processor I-12 is connected to the solenoid valve I-11 through the dual-direction joint I-14 to control the incoming of the gas, the outlet of the solenoid valve I-11 is connected with a tee I-10, the high-pressure gas enters the frequency generator I-15 through one outlet pipeline I-16 of the tee I-10, the input frequency of the gas is controlled through the frequency generator I-15, the high-pressure enters the precise micro lubricating pump I-8 through the pipeline I-17 after coming out of the frequency generator I-15; in addition, the high-pressure gas enters the precise micro lubricating pump I-8 through another outlet pipeline I-18, one end of the oil cup joint I-2 is in threaded connection, the other end is in threaded connection with the lubricating pump fixing cover I-7, the lubricating pump fixing cover I-7 is connected with the precise micro lubricating pump I-8 through two fastening screws I-6, the lubricating pump fixing cover I-7 is fixed on the box body I-1 through two fastening screws I-4 and the gaskets I-5, the quantity of the high-pressure gas is adjusted by adjusting the gas quantity adjustment knob I-9, the quantity of the lubricating oil is adjusted by adjusting the oil quantity adjustment knob I-19, and finally, lubricating oil is provided for the cutting system IV by connecting the oil pump outlet joint I-20 with the nozzle joint IV-6.

Figure 3:
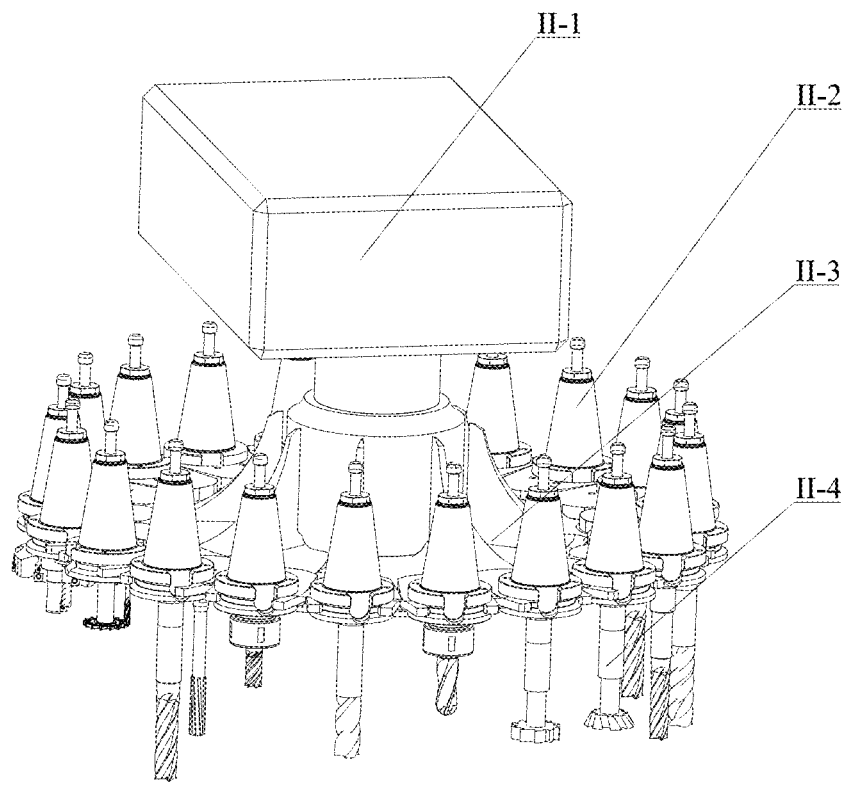
FIG. 3 is a shaft side view of a magazine system.
Figure 4:
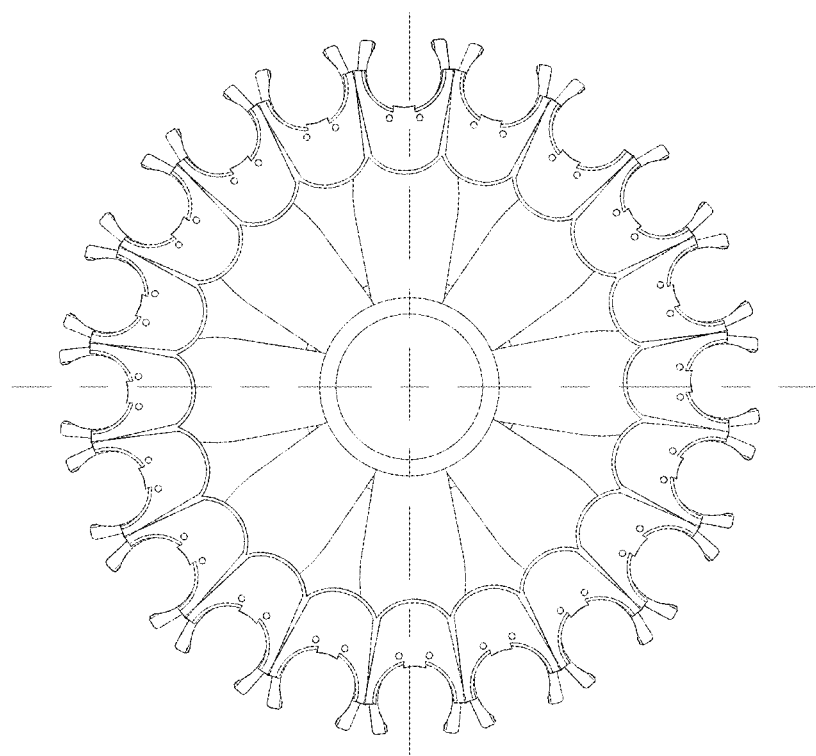
FIG. 4 is a top view of a cutter head.
Figure 5:
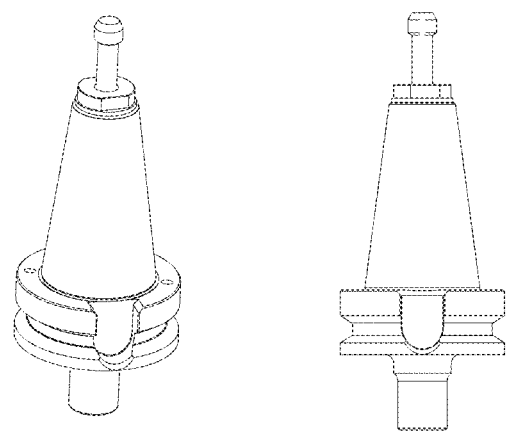
FIG. 5 is a shaft side view and a front view of a mandrel.
Figure 6:
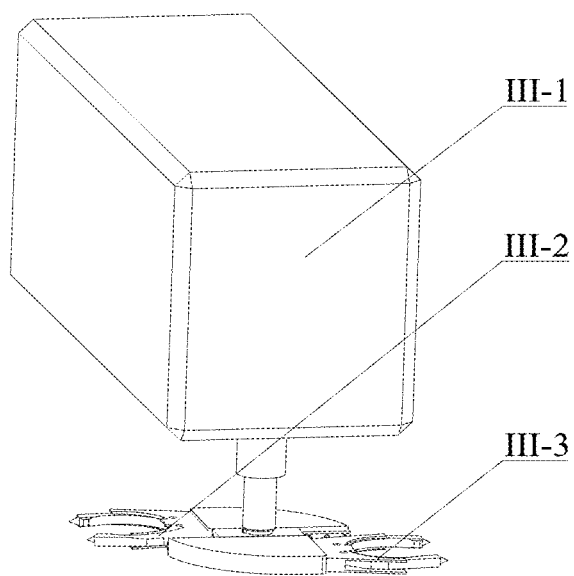
FIG. 6 is a shaft side view of a cutter change system.

FIG. 3 is a shaft side view of a magazine system, FIG. 4 is a side view of a cutter head, FIG. 5 is a shaft side view and a front view of a mandrel, and FIG. 6 is a shaft side view of a cutter change system.

Referring to FIGS. 3-6, the motor case II-1 realizes rotation of the cutter head II-3 through an interior structure and then drives the rotation of the mandrel II-2 and the cutter II-4 on the cutter head II-3, the motor case III-1 realizes the position conversion of the mechanical arm III-2 and the mechanical arm III-3 through the interior structure so as to achieve the change of the processing cutter, thereby realizing selection of different cutters for processing according to different working conditions.

Figure 7:
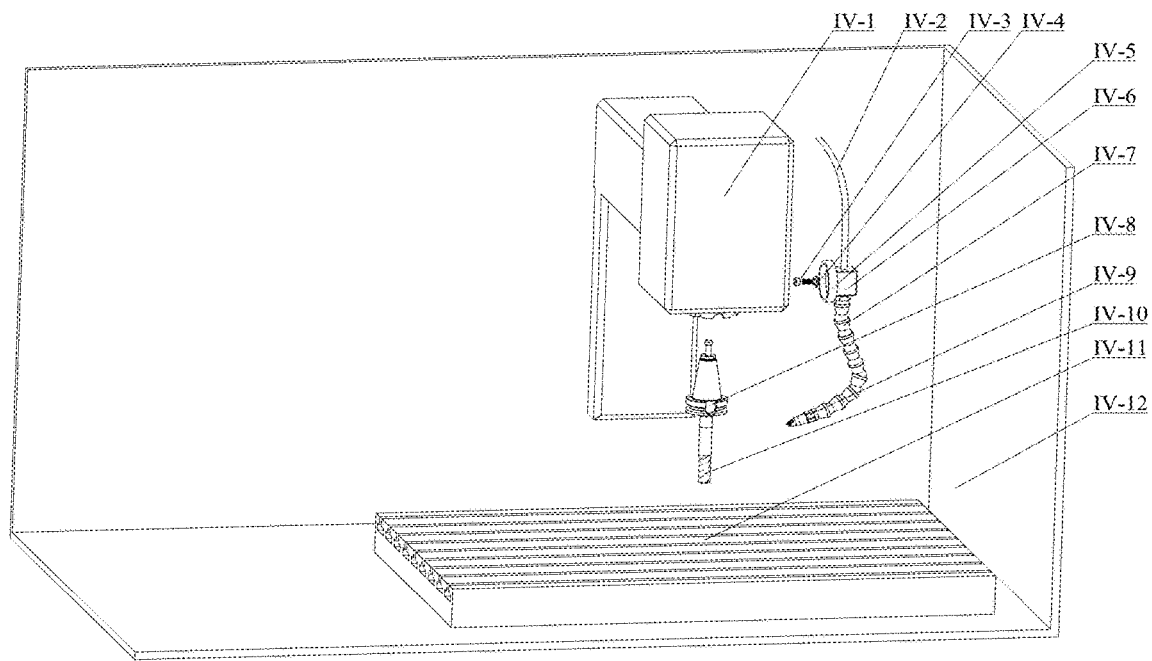
FIG. 7 is a shaft side view of a cutting system.

FIG. 7 is a shaft side view of a cutting system. The motor case IV-1 realizes rotation of the mandrel IV-8 through the interior structure, so that the principal axis milling cutter IV-10 rotates and milling is realized. The lubricating oil provided by the lubricating system I is sprayed to the cutting area through the pipeline IV-2, the nozzle pipe IV-7 and the nozzle IV-9. The magnetic sucking disc IV-5 is fixed with the nozzle joint IV-6 through the screw IV-3 and the gasket IV-4, and the magnetic sucking disc IV-5 is sucked on the case body of the motor case IV-1.

Figure 8:
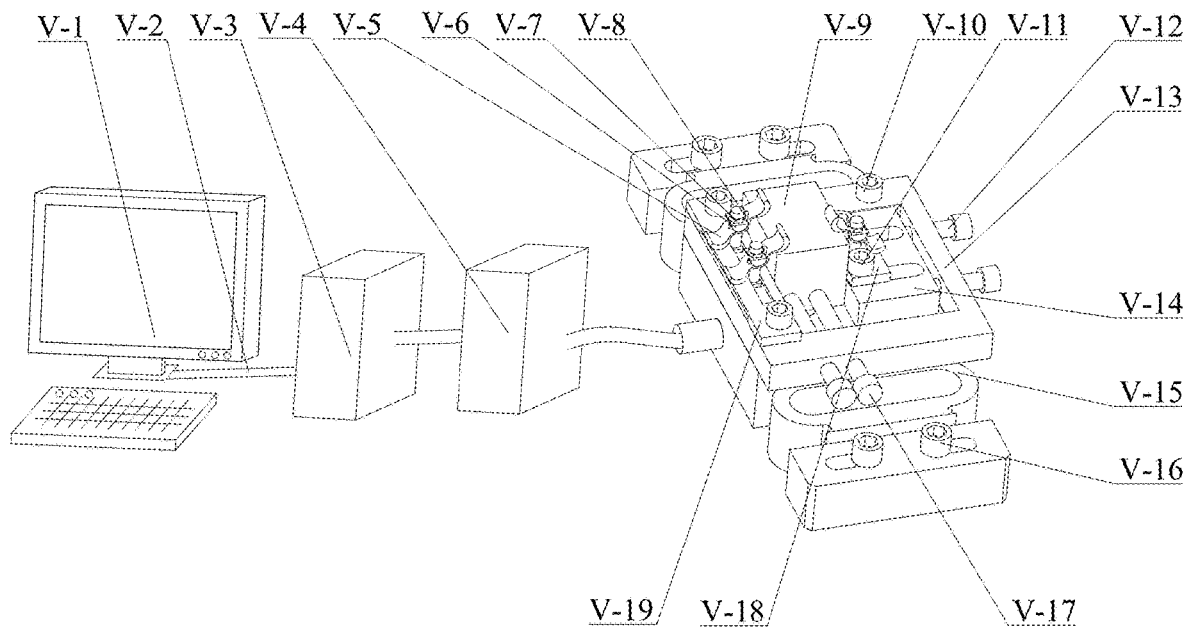
FIG. 8 is a shaft side view of a force measurement system.
Figure 9:
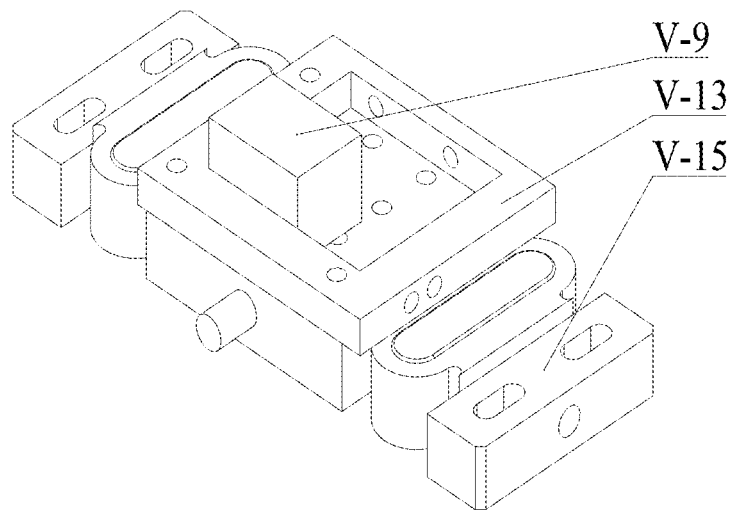
FIG. 9 is a diagram showing positioning and clamping of a workpiece.
Figure 10:
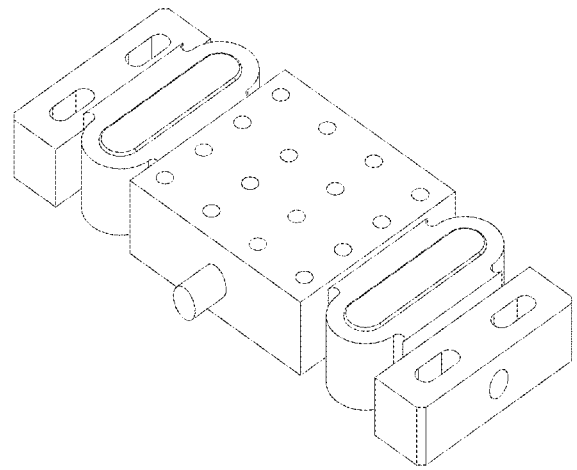
FIG. 10 is a shaft side view of a milling force measuring instrument.

FIG. 8 is a shaft side view of a force measurement system, FIG. 9 is a graph showing positioning and clamping of a workpiece, and FIG. 10 is a shaft side view of a force measurement instrument.

Referring to FIGS. 8-10, the force measurement instrument V-15 is fastened on the workbench IV-11 with screws V-16. The workpiece holder V-13 is fixed on the workbench of the force measurement instrument V-15, and the workpiece V-9 is placed on the workbench of the force measurement instrument V-15. The six freedoms degrees of the workpiece V-9 can be fully positioned through the workpiece holder V-13 and the workbench of the force measurement instrument V-15. Two positioning screws V-12 used for clamping in the X-axis direction of the workpiece V-9, and the workpiece V-9 is clamped with the workpiece holder screw V-17 in the Y direction of the workpiece. One face of the positioning block V-14 is in contact with the side of the workpiece V-9 and the other face is in contact with two positioning screws V-12. The positioning screw V-12 is screwed so that the positioning block V-14 is clamped in the X direction of the workpiece V-9. The workpiece V-9 is clamped with three pressing plates V-5 in the Z direction. The three pressing plates V-5 constitute a self-adjusting pressing plate by virtue of the flat plate V-18, the flat plate V-19, the cylindrical gasket V-6, the pressing plate screw V-8 and the pressing plate nut V-7. When the length, width and height of the workpiece V-9 are changed, the adjustment of equipment can be realized by two holder screws V-17, two positioning screws V-12 and three pressing plates V-5, thereby meeting the requirement on change in the size of the workpiece V-9. The positioning block V-14 is clamped with the small pressing plate screw V-11 and the positioning screw V-12. When the cutting force is applied to the workpiece V-9, the measurement signal is amplified by the amplifier V-4 and then transmitted to the force information acquisition instrument V-3, and finally, the signal is transmitted to the computer V-1 via the wire V-2 and the cutting force is displayed.

Figure 11:
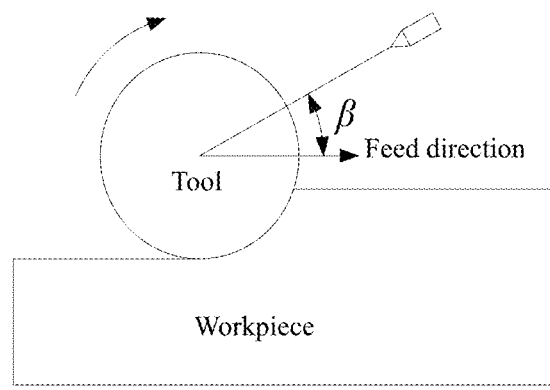
FIG. 11 is a schematic diagram of nozzle angle 3.
Figure 12:
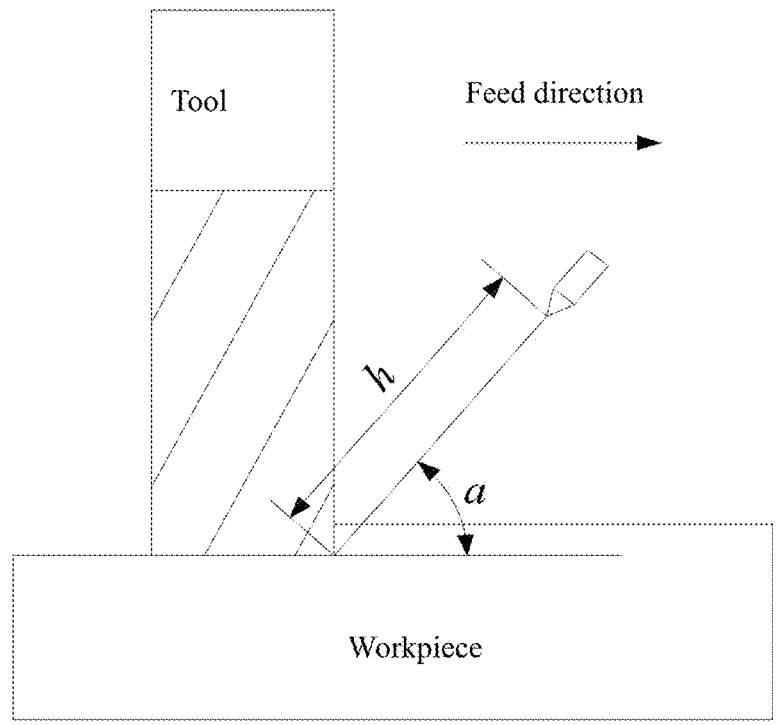
FIG. 12 is a schematic diagram of nozzle angle α.

FIG. 11 is a schematic diagram of nozzle angle $\beta$, and FIG. 12 is a schematic diagram of nozzle angle $\alpha$.

Referring to FIG. 11 and FIG. 12, in milling, the position of the nozzle has a very important influence on the cooling and lubricating effect of the cutting fluid. Among them, the target distance (h) has the greatest influence, then the angle ($\beta$) between the nozzle and the milling cutter feeding direction has the second influence, and the angle ($\alpha$) between the nozzle and the surface of the workpiece has the least influence. Due to the effect of the airflow field in milling, the optimal jet flow position of the nozzle changes with the change in different working conditions.

Figure 13:
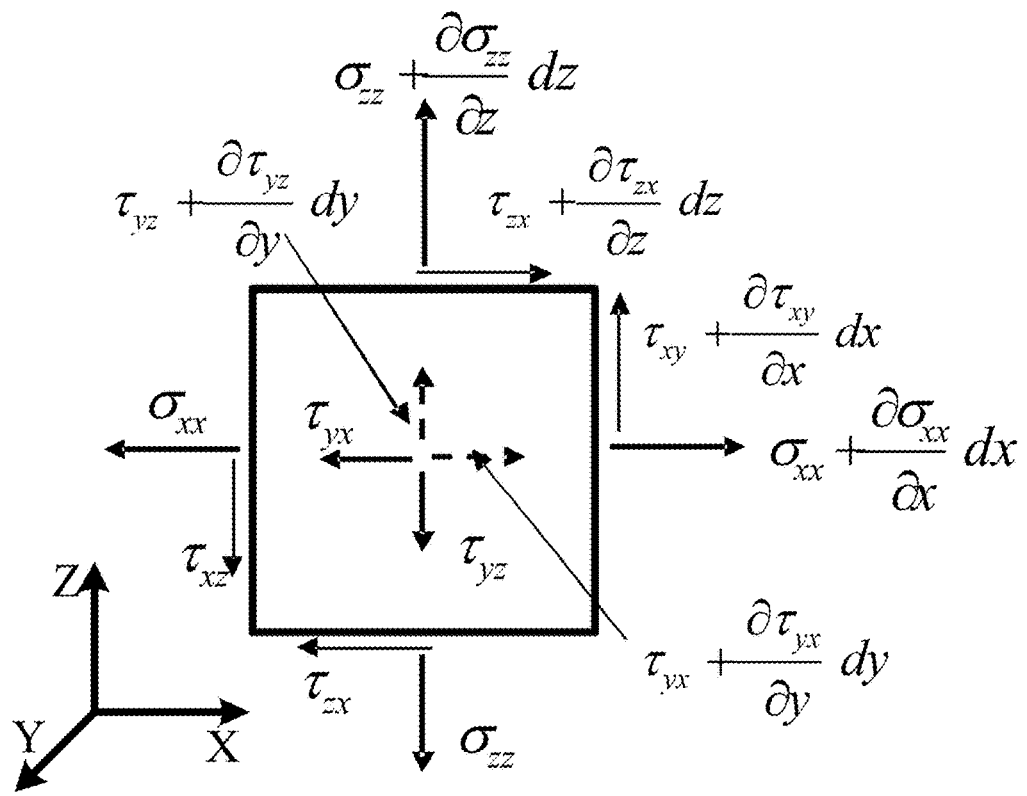
FIG. 13 is a schematic diagram of surface forces in X and Y directions on an air flow micro element.

FIG. 13 is a schematic diagram of surface forces on the gas flow micro elements in the X and Y directions.

Referring to FIG. 13, a rectangular air fluid micro element is selected on the surface of the milling cutter edge, the air gravity is ignored, and the air can be regarded as incompressible fluid at low speed. For the hexahedral micro element, in the x direction, the mass difference between input and output at the x and x+dx positions of hexahedron within dt time:

$$(\rho v_x dydzdt) - \left[\rho v_x + \frac{\partial (\rho v_x)}{\partial x}dx\right]dydzdt = -\frac{\partial (\rho v_x)}{\partial x}dxdydzdt \qquad (1)$$

Within the dt time, the mass difference between input and output in the whole hexahedron:

$$-\frac{\partial (\rho v_x)}{\partial x}dxdydzdt - \frac{\partial (\rho v_y)}{\partial y}dxdydzdt - \frac{\partial (\rho v_z)}{\partial z}dxdydzdt = \qquad (2)$$

$$-\left[\frac{\partial (\rho v_x)}{\partial x} + \frac{\partial (\rho v_y)}{\partial y} + \frac{\partial (\rho v_z)}{\partial z}\right]dxdydzdt$$

The formula of the mass change in the micro element (3):

$$\frac{\partial \rho}{\partial t}dxdydzdt \qquad (3)$$

Therefore, a continuous equation represents the formula (4), its physical significance is that an algebraic sum of an output and input mass difference and an interior mass change of fluid flowing through a unit volume space in unit time is zero.

$$\frac{\partial \rho}{\partial t} + \frac{\partial (\rho v_x)}{\partial x} + \frac{\partial (\rho v_y)}{\partial y} + \frac{\partial (\rho v_z)}{\partial z} = 0 \qquad (4)$$

A vector form is as follows:

$$\nabla \cdot (\rho \vec{v}) + \frac{\partial \rho}{\partial t} = 0 \qquad (5)$$

Continuity equation is one of the most basic differential equations of fluid flow. The continuous motion of any fluid must be satisfied.

The differential equation of ideal fluid motion is an important theoretical basis for the study of fluid kinematics. It can be deduced by Newton's second law. The positive direction of the x-axis of the micro element is subjected to mass force $f_x \rho dxdydz$ and surface force $$p - \frac{\partial p}{\partial x}\frac{dx}{2},$$

and the negative direction of the x-axis is subject to surface force $$p + \frac{\partial p}{\partial x}\frac{dx}{2}.$$

The motion differential equation in the x axis direction is obtained according to Newton's second law:

$$f_x \rho dxdydz + \left(p - \frac{\partial p}{\partial x}\frac{dx}{2}\right)dydz - \left(p + \frac{\partial p}{\partial x}\frac{dx}{2}\right)dydz = \rho dxdydz \frac{du_x}{dt} \qquad (6)$$

The differential equation of ideal fluid motion, namely, differential equation of Eulerian motion is:

$$\left. \begin{array}{l} f_x - \frac{1}{\rho}\frac{\partial p}{\partial x} = \frac{du_x}{dt} \\ f_y - \frac{1}{\rho}\frac{\partial p}{\partial y} = \frac{du_y}{dt} \\ f_z - \frac{1}{\rho}\frac{\partial p}{\partial z} = \frac{du_z}{dt} \end{array} \right\} \rightarrow \left\{ \begin{array}{l} \frac{\partial u_x}{\partial t} + \frac{\partial u_x}{\partial x}u_x + \frac{\partial u_x}{\partial y}u_y + \frac{\partial u_x}{\partial z}u_z = X - \frac{1}{\rho}\frac{\partial p}{\partial x} \\ \frac{\partial u_y}{\partial t} + \frac{\partial u_y}{\partial x}u_x + \frac{\partial u_y}{\partial y}u_y + \frac{\partial u_y}{\partial z}u_z = Y - \frac{1}{\rho}\frac{\partial p}{\partial y} \\ \frac{\partial u_z}{\partial t} + \frac{\partial u_z}{\partial x}u_x + \frac{\partial u_z}{\partial y}u_y + \frac{\partial u_z}{\partial z}u_z = Z - \frac{1}{\rho}\frac{\partial p}{\partial z} \end{array} \right. \qquad (7)$$

The stress at any point in a viscous flow field has 9 components, including 3 normal stress components and 6 shearing stress components. The total force component of the micro element surface force is further derived:

$$\begin{cases} X: \frac{\partial \sigma_{xx}}{\partial x}dxdydz + \frac{\partial \tau_{yx}}{\partial y}dydxdz + \frac{\partial \tau_{zx}}{\partial z}dzdxdy = \\ \qquad \left(\frac{\partial \sigma_{xx}}{\partial x} + \frac{\partial \tau_{yx}}{\partial y} + \frac{\partial \tau_{zx}}{\partial z}\right)dxdydz \\ Y: \frac{\partial \tau_{xy}}{\partial x}dxdydz + \frac{\partial \sigma_{yy}}{\partial y}dydxdz + \frac{\partial \tau_{zy}}{\partial z}dzdxdy = \\ \qquad \left(\frac{\partial \tau_{xy}}{\partial x} + \frac{\partial \sigma_{yy}}{\partial y} + \frac{\partial \tau_{zy}}{\partial z}\right)dxdydz \\ Z: \frac{\partial \tau_{xz}}{\partial x}dxdydz + \frac{\partial \tau_{yz}}{\partial y}dydxdz + \frac{\partial \sigma_{zz}}{\partial z}dzdxdy = \\ \qquad \left(\frac{\partial \tau_{xz}}{\partial x} + \frac{\partial \tau_{yz}}{\partial y} + \frac{\partial \sigma_{zz}}{\partial z}\right)dxdydz \end{cases} \qquad (8)$$

The motion equation represented by stress is as follows:

$$\begin{cases} X: \rho\left(\frac{\partial v_x}{\partial t} + v_x\frac{\partial (v_x)}{\partial x} + v_y\frac{\partial (v_x)}{\partial y} + v_z\frac{\partial (v_x)}{\partial z}\right) = \\ \qquad f_x \rho + \left(\frac{\partial \sigma_{xx}}{\partial x} + \frac{\partial \tau_{yx}}{\partial y} + \frac{\partial \tau_{zx}}{\partial z}\right) \\ Y: \rho\left(\frac{\partial v_y}{\partial t} + v_x\frac{\partial (v_y)}{\partial x} + v_y\frac{\partial (v_y)}{\partial y} + v_z\frac{\partial (v_y)}{\partial z}\right) = \\ \qquad f_y \rho + \left(\frac{\partial \tau_{xy}}{\partial x} + \frac{\partial \sigma_{yy}}{\partial y} + \frac{\partial \tau_{zy}}{\partial z}\right) \\ Z: \rho\left(\frac{\partial v_z}{\partial t} + v_x\frac{\partial (v_z)}{\partial x} + v_y\frac{\partial (v_z)}{\partial y} + v_z\frac{\partial (v_z)}{\partial z}\right) = \\ \qquad f_z \rho + \left(\frac{\partial \tau_{xz}}{\partial x} + \frac{\partial \tau_{yz}}{\partial y} + \frac{\partial \sigma_{zz}}{\partial z}\right) \end{cases} \qquad (9)$$

The above formula is the motion equation of viscous fluid represented by stress, which is applicable to laminar fluid, turbulent fluid, Newtonian fluid and non-Newtonian fluid. In order to specifically describe the motion of fluid, Navier-Stokes equation (N-S equation for short) must be established. An equation set is established under constant viscosity according to N-S equation:

$$\begin{cases} \frac{dv_x}{dt} = f_x - \frac{1}{\rho}\frac{\partial p}{\partial x} + v\left(\frac{\partial^2 v_x}{\partial x^2} + \frac{\partial^2 v_x}{\partial y^2} + \frac{\partial^2 v_x}{\partial z^2}\right) + \frac{1}{3}v\frac{\partial \nabla \cdot \vec{v}}{\partial x} \\ \frac{dv_y}{dt} = f_y - \frac{1}{\rho}\frac{\partial p}{\partial y} + v\left(\frac{\partial^2 v_y}{\partial x^2} + \frac{\partial^2 v_y}{\partial y^2} + \frac{\partial^2 v_y}{\partial z^2}\right) + \frac{1}{3}v\frac{\partial \nabla \cdot \vec{v}}{\partial y} \\ \frac{dv_z}{dt} = f_z - \frac{1}{\rho}\frac{\partial p}{\partial z} + v\left(\frac{\partial^2 v_z}{\partial x^2} + \frac{\partial^2 v_z}{\partial y^2} + \frac{\partial^2 v_z}{\partial z^2}\right) + \frac{1}{3}v\frac{\partial \nabla \cdot \vec{v}}{\partial z} \end{cases} \qquad (10)$$

The vector form is as follows:

$$\frac{d\vec{v}}{dt} = \vec{f} - \frac{1}{\rho}\nabla p + v\nabla^2 \vec{v} + \frac{1}{3}v\nabla(\nabla \cdot \vec{v}) \qquad (11)$$

A flow function and a vorticity equation are seen in formulas 12 and 13.

$$\frac{\partial^2 \psi}{\partial x^2} + \frac{\partial^2 \psi}{\partial y^2} = -\Omega \qquad (12)$$

$$\frac{\partial \Omega}{\partial t} + \frac{\partial \psi}{\partial y}\frac{\partial \Omega}{\partial x} - \frac{\partial \psi}{\partial x}\frac{\partial \Omega}{\partial y} = \gamma\left(\frac{\partial^2 \Omega}{\partial x^2} + \frac{\partial^2 \Omega}{\partial y^2}\right) \qquad (13)$$

Further, boundary conditions are selected according to solved problems. The flow function values of all nodes in the whole flow field can be obtained by using the iterative method.

Figure 14:
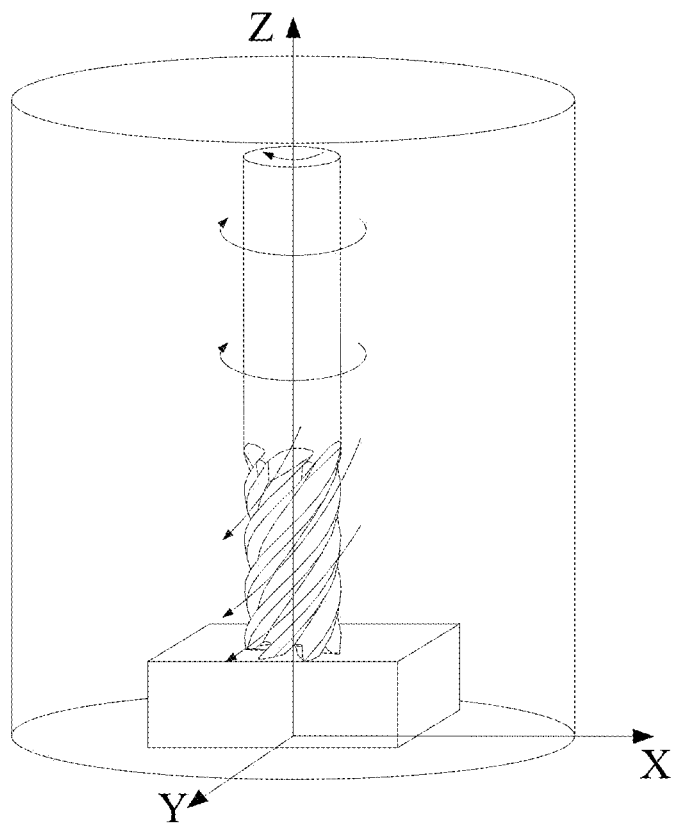
FIG. 14 is a schematic diagram of a physical model of a milling airflow field and an airflow field.

FIG. 14 is a physical model of a milling airflow field and a schematic diagram of an airflow field.

Referring to FIG. 14, in high-speed milling, the spindle drives the cutter to rotate at high speed, rotation motion can disturb the surrounding air and create an air boundary layer around the milling cutter to hinder the cutting fluid to enter the processing area. The handle part of the milling cutter is cylindrical, and the formed air flow is circumferential flow. The cutting-edge part has a milling cutter groove, and revolving air flow along the direction of the cutter groove is formed. The circumferential flow and the revolving air flow are influenced from each other, which has an inhibition effect on the supply of cutting fluid.

Therefore, the distribution of the airflow field around the rotary milling cutter is simulated by using FLUENT software. The model conditions are as follows: milling cutter diameter r=20 mm, milling cutter helical angle β=300, rotation speed n=1200 r/min, the milling cutter is in a static airflow field, and simulation parameters are shown in table 1.

TABLE 1

Simulation parameters of flow field of rotary milling cutter

| Name | Sizes |
|---|---|
| Diameter of milling cuter (mm) | 20 |
| Helical angle (°) | 30 |
| Rotation speed of milling cutter (r/min) | 1200 |
| Diameter of flow field (mm) | 150 |

A 3D solver is used to calculate the simulation. The air is selected as a flow medium, a flow field outlet boundary is set as a pressure outlet boundary, namely, pressure-outlet boundary, the boundary condition of the workpiece is set as a static wall, the boundary condition of the milling cutter is set as a rotating wall, the boundary conditions are initialized, and solution is performed after residual monitoring is set. After a certain number of iterations, the calculation results are obtained after convergence.

Figure 15:
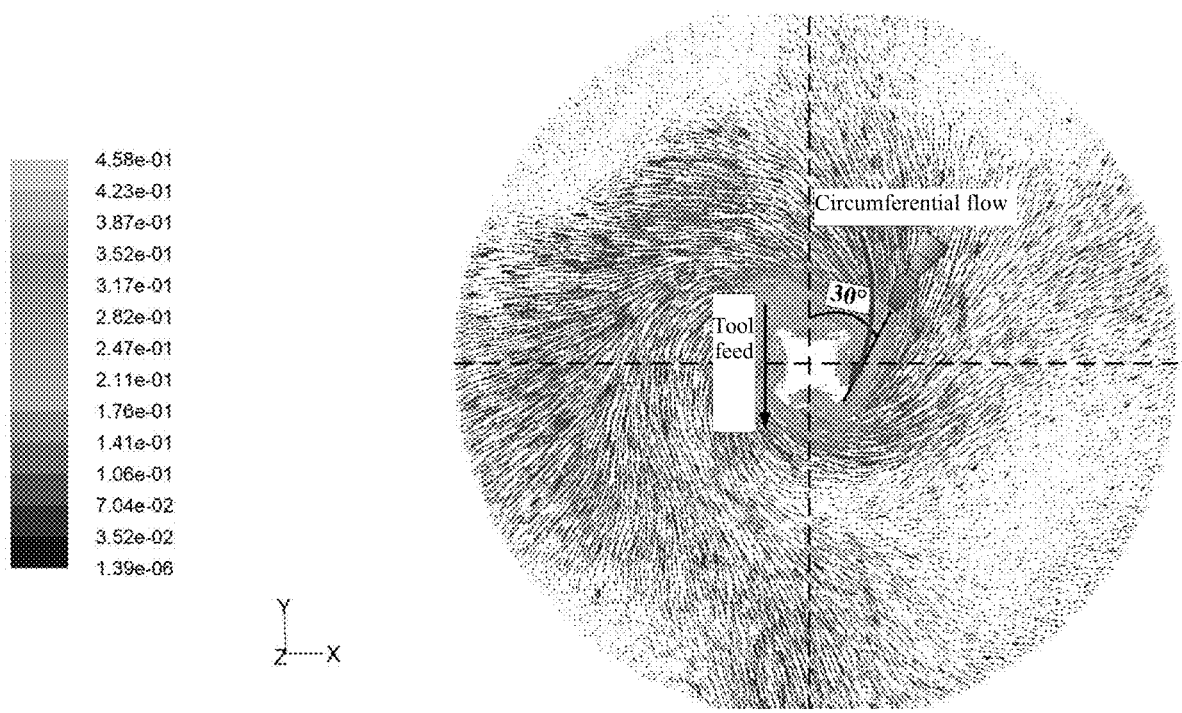
FIG. 15 is a cross-sectional view of a section airflow field of Z=20 mm.

FIG. 15 is an airflow field screenshot having a Z=20 mm section.

Referring to FIG. 15, airflow formed by a rotary milling cutter in the circumferential direction is called the circumferential flow. It can be seen that the circumferential flow is spiral, the feed direction of the milling cutter is in the negative direction of the Y axis, the jet flow of the nozzle is toward the milling cutter tip, and when the jet flow direction is tangent to the flow line of the air flow field, the cutting fluid is injected along the airflow direction, the air flow field can play a role in auxiliary transportation of the injection of cutting fluid so as to transport more cutting fluid to the surface of the cutter/workpiece, and therefore the jet flow angle of the nozzle at this moment is the optimal jet flow angle, the jet flow and the milling cutter feeding direction are angled at 30°.

Figure 16:
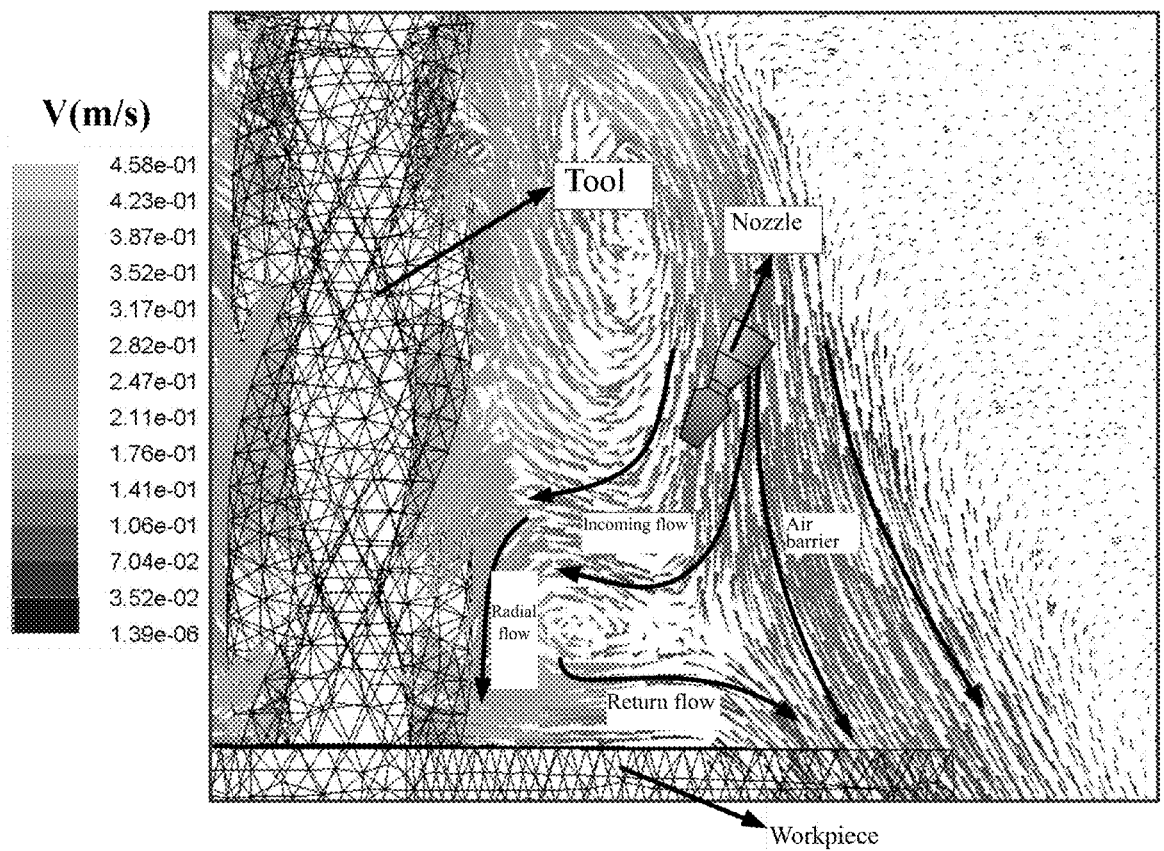
FIG. 16 is a partial enlarged view of a 30° section air flow field.

FIG. 16 is a partial enlarged view of an air flow field having a 30° section.

Referring to FIG. 16, the angle and distance between the jet flow and the horizontal direction also affect the injection of the cutting fluid, and therefore the sectional airflow field is further analyzed when the jet flow and the milling cutter feeding direction are angled at 30°. It can be seen that various air flows around the milling area are distributed. The outermost layer is the air barrier which hinders the cutting fluid to enter the cutting area, and therefore there is a need to avoid the position of the jet flow to be beyond the air barrier. The incoming flow is airflow whose direction is directed to the surface of the milling cutter, which is beneficial to entering of the cutting fluid, the cutting fluid reaches the periphery of the milling cutter and the milling cutter groove along with the incoming air flow so as to take the effect of transporting the cutting fluid. One portion of cutting fluid is adhered to the surface of the workpiece to form a layer of lubricating oil film so as to take the effects of reducing abrasion and resisting abrasion and cooling the lubricating cutter/workpiece interface. One portion of cutting fluid flows out along with "return flow", the "return flow" is air flow whose direction is opposite to the surface of the milling cutter, the existence of "return flow" makes partial cutting fluid flow out of the cutting area and meanwhile plays a role in inhibiting the cutting fluid to enter the cutting area, and therefore it should be avoided that the injection of the cutting fluid is in contact with "return flow". The optimal injection angle and distance of the cutting fluid are as shown in the drawings. According to measurement, when the nozzle jet flow direction and the cutter feeding direction are angled at 30° and when the axis of the nozzle and the surface of the workpiece are at a certain angle (40°-50°) and in a certain distance (20-30 mm), the airflow field can play a role in transporting the cutting fluid, and meanwhile "return flow" can hinder the cutting fluid to the smallest extent so that the cutting fluid more easily enters the cutting area, thereby presenting the maximal lubricating and cooling effects.

Figure 17:
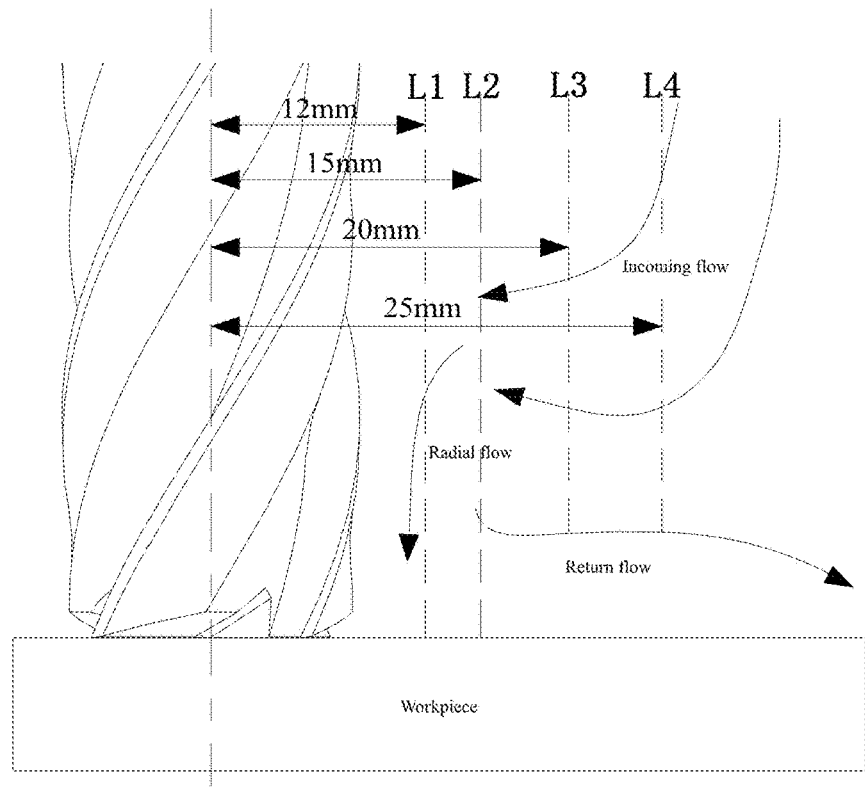
FIG. 17 is a schematic diagram of a measurement section line.

FIG. 17 is a diagram of a measurement section line.

Referring to FIG. 17, in order to quantitatively study the position of return flow and the thickness of radial flow in the milling flow field, on a section which is at 30° from the milling cutter feeding direction, measurement is carried out on four measurement sections with different distances from the center of the milling cutter in the milling flow field. The four measurement sections are distanced from the center of the milling cutter by L1=12 mm, L2=15 mm, L3=20 mm and L4=25 mm respectively.

Figure 18:
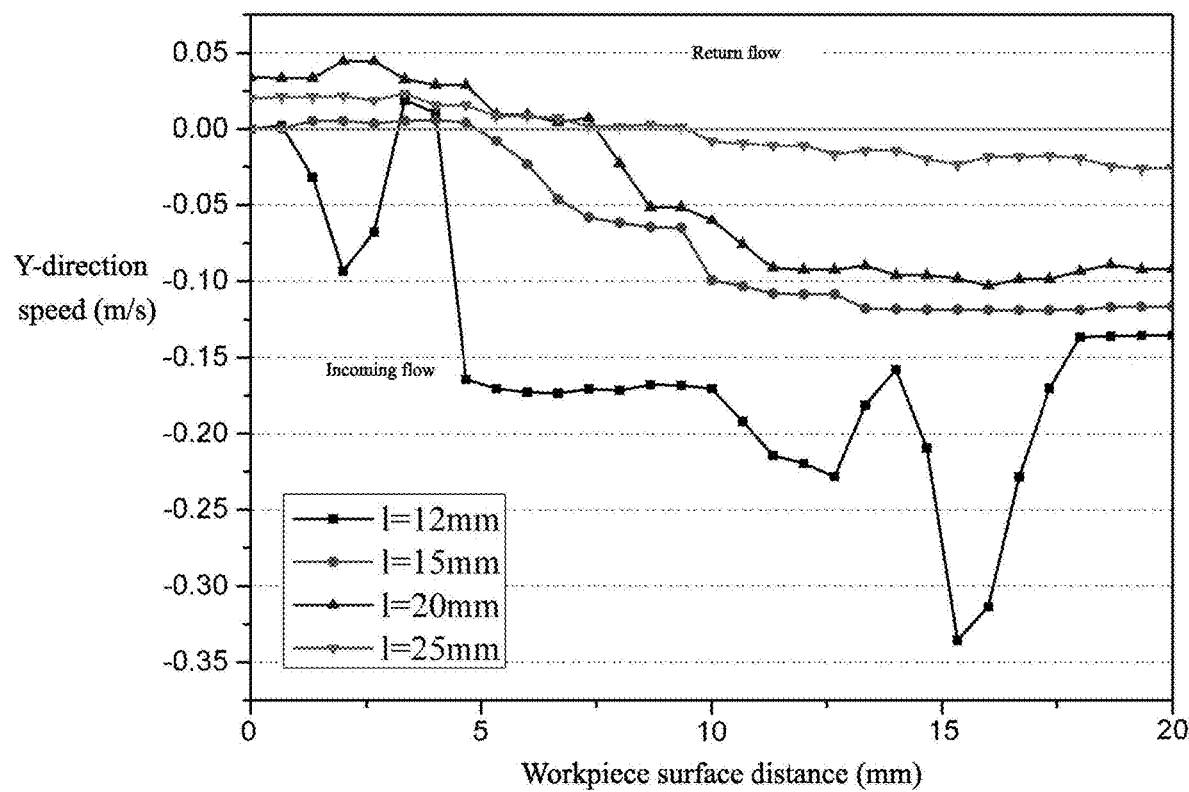
FIG. 18 is a graph of a Y-direction speed curve on four section lines.
Figure 19:
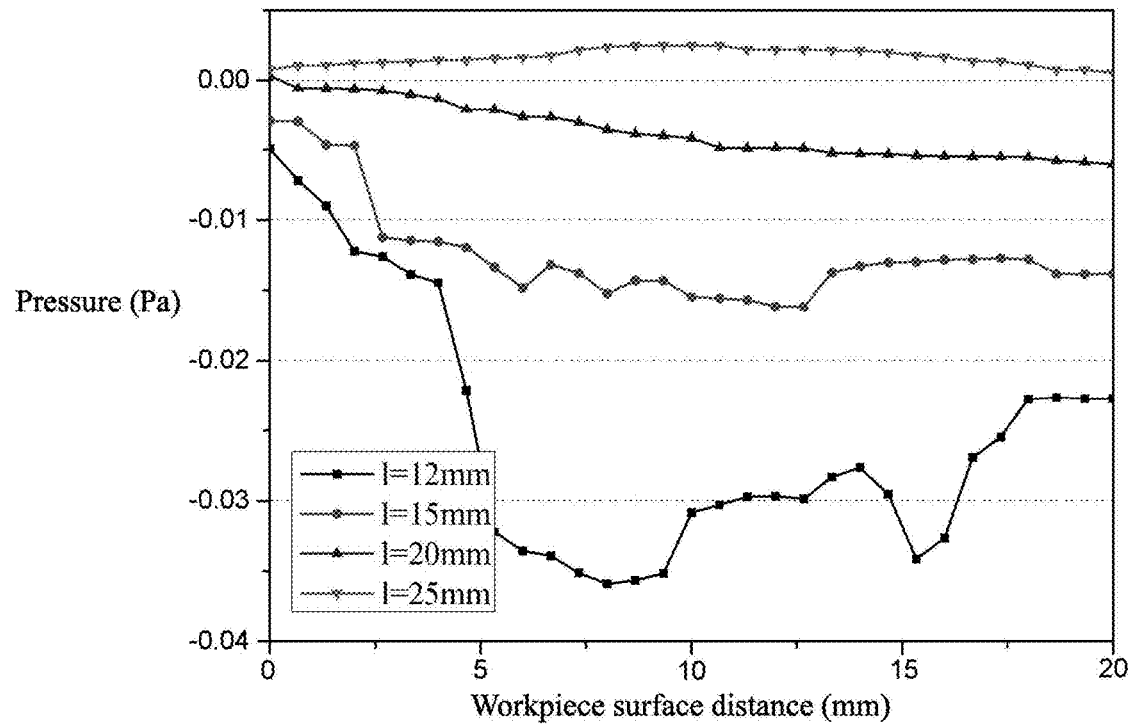
FIG. 19 is a graph of a pressure curve on four section lines.

FIG. 18 is a speed curve graph in the Y direction on four section lines, and FIG. 19 is a graph of a pressure curve on four section lines.

Referring to FIGS. 18 and 19, according to analysis, on the 30° section, when the speed in the Y direction is negative, the speed direction points to the milling cutter, which represents that the air flow flows toward the milling cutter at this moment and is the incoming flow; and when the speed in the Y direction is positive, which represents that the air flow flows out of the milling cutter at this moment and is the return flow. The size of X axis represents the distance from the surface of the workpiece, and the larger the X is, the farther it is from the surface of the workpiece. On the section line of L=12 mm, when x is 0-4 mm, the speed in the Y direction is negative, and there is no return flow, but when x=4-4.5 mm, the speed in the Y direction is positive, and the return flow appears. When x>4.5 mm, the return flow disappears again, which means that the return flow appears at L=12 mm, the thickness of the radial flow is 2 mm, and the speed of the air flow is the largest. On the section line of L=15 mm, when x<5 mm, the speed is positive, and the air flow is return flow at this moment. When x>5 mm, the speed is negative, and the air flow is incoming flow. On the section lines of L=20 mm and 25 mm, when the target distance of return flow is x=0~7 mm, when x>7 mm, the air flow is the incoming flow, and the farther the distance from the milling cutter, the smaller the speed of the return flow is. Further, the distribution of pressures around the milling cutter is analyzed. The pressure curve on the four section lines is as shown in FIG. 19. On the three section lines from the milling cutter by 2 mm, 5 mm and 10 mm, the air pressure is negative, and the closer the milling cutter is, the smaller the pressure is, and the minimum pressure is in the milling groove. On the section line from the milling cutter by 15 mm, the air pressure is positive. Under the effect of the pressure difference, the air more easily enters the milling cutter/workpiece surface.

Figure 20:
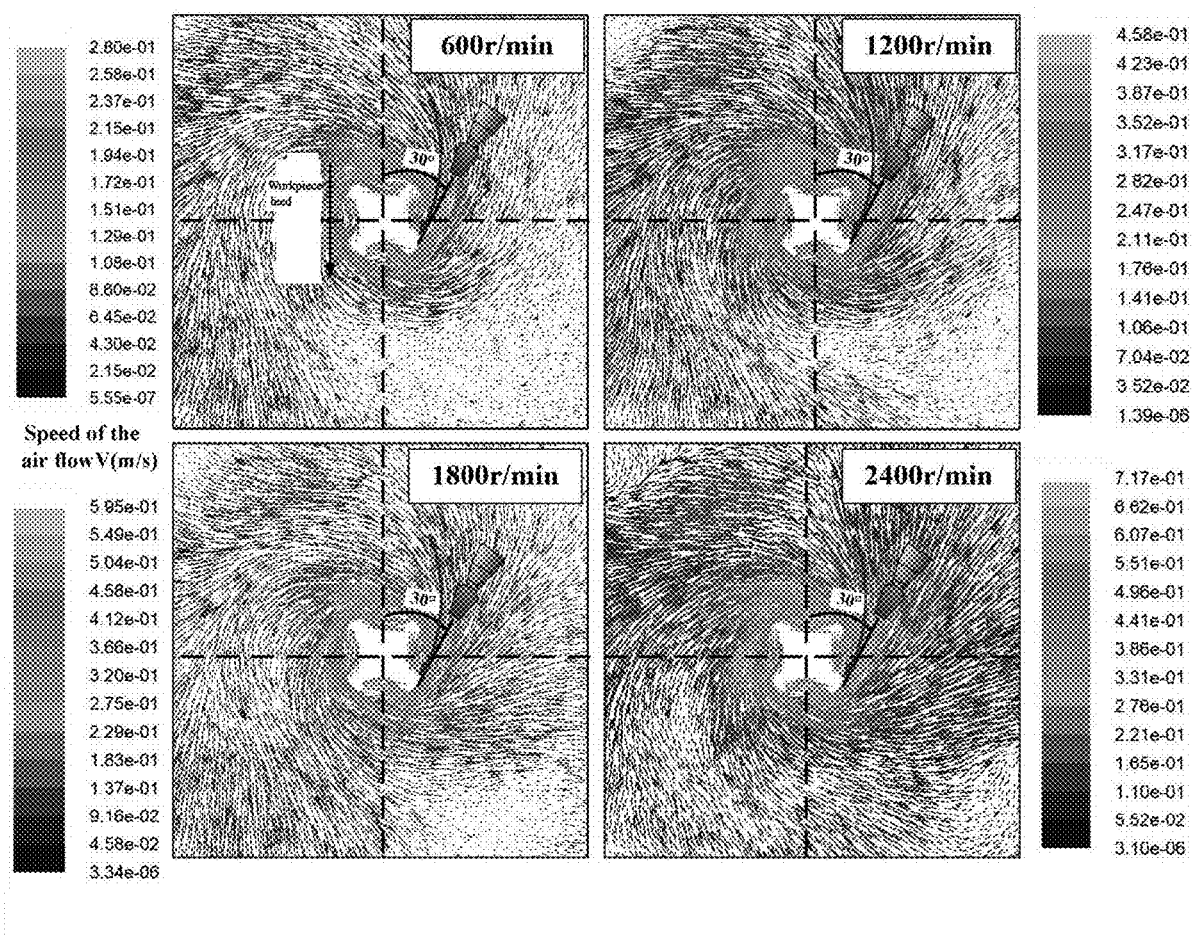
FIG. 20 is a flow line diagram of an air flow field having a Z=20 mm section at different rotation speeds.

FIG. 20 is a flow line diagram of an air flow field having a Z=20 mm section at different rotation speeds.

Figure 21:
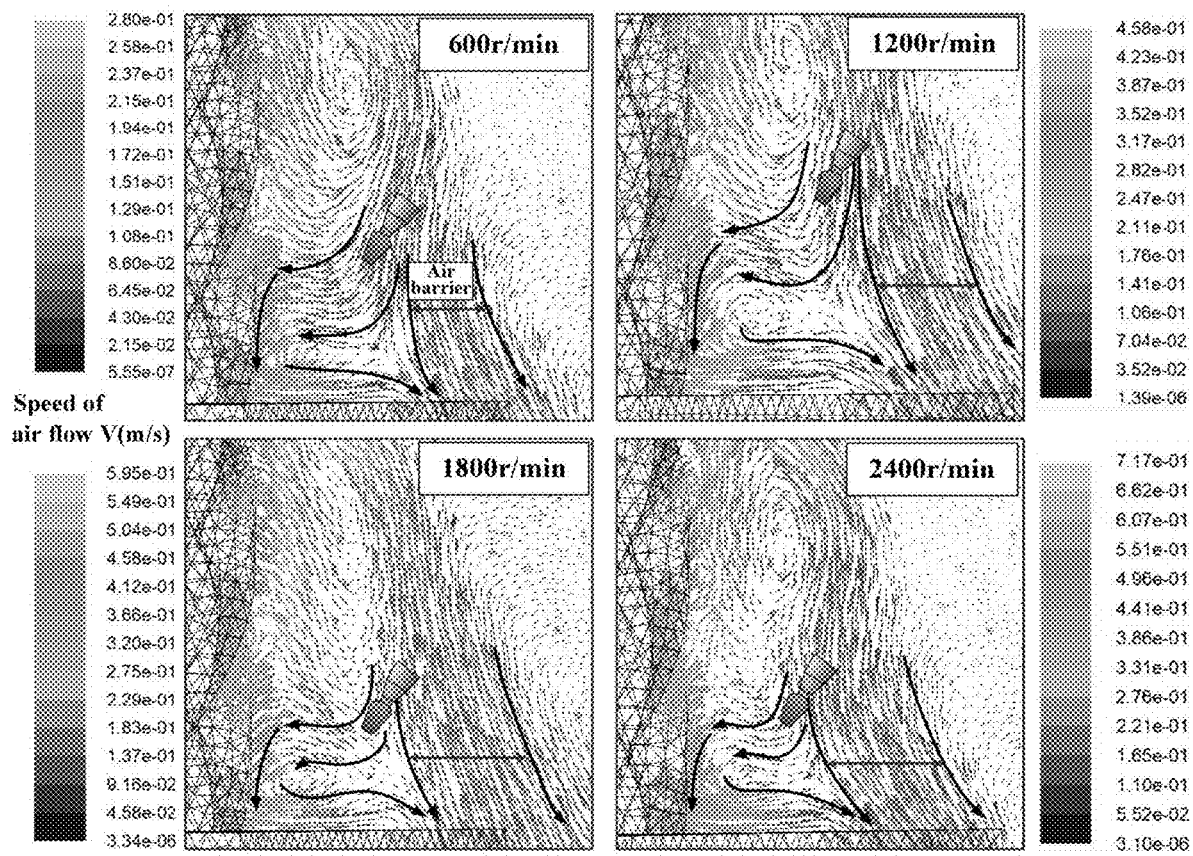
FIG. 21 is a flow line diagram of an air flow field having a 30° section at different rotating speeds.

FIG. 21 is a flow line diagram of an air flow field having a 30° section at different rotation speeds.

Referring to FIGS. 20 and 21, the rotation speed of the cutter can affect the air flow field in the milling area. Therefore, under the condition that the diameter, helical angle and other parameters of the cutter are kept constant, the rotation speed of the cutter is changed to 600 r/min, 1200 r/min, 1800 r/min and 2400 r/min respectively, and the change of the air flow field is observed. It can be seen that the rotation speed does not affect the shape of the air flow field in the circumferential direction, so the rotation speed of the milling cutter does not affect the angle between the nozzle and the milling cutter feeding direction, and it is most conducive to the injection of cutting fluid when they are 30°. According to FIG. 21, it can be seen that the size of the incoming flow decreases with the increase of the rotation speed of the milling cutter, while the size of the air barrier gradually increases, indicating that the increase of the rotation speed of the milling cutter can increase the difficulty of the cutting fluid entering the milling cutter/workpiece interface. At the same time, the optimal distance of the nozzle should be within the air barrier, and therefore the optimal target distance can decrease with the increase of the rotation speed of the milling cutter. As can be seen from the drawings, when the rotation speed of the milling cutter are 600 r/min and 1200 r/min, the maximum target distance should be within 30 mm. When the rotation speeds of the milling cutter are 1800 r/min and 2400 r/min, the maximum target distance should be within 20 mm. Further, the rotation speed of the milling cutter does not affect the angle between the nozzle and the surface of the workpiece, that is, 40°-50° is the most favorable for the transportation of cutting fluid to the milling cutter/workpiece interface.

Figure 22:
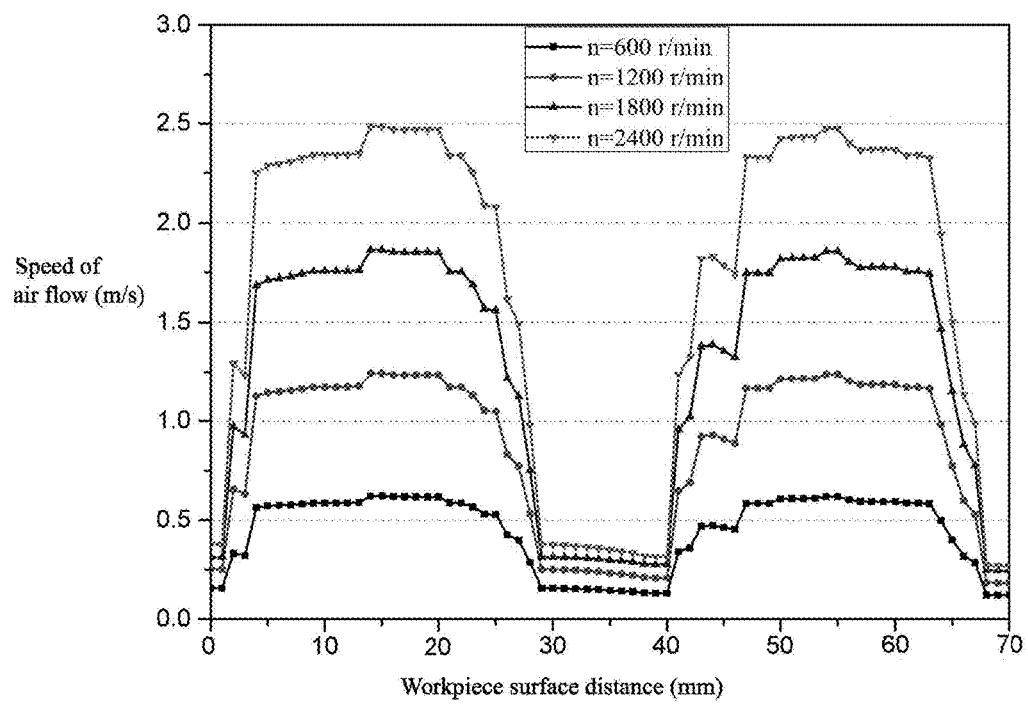
FIG. 22 is a flowing speed graph of air around a milling cutter at different speeds.
Figure 23:
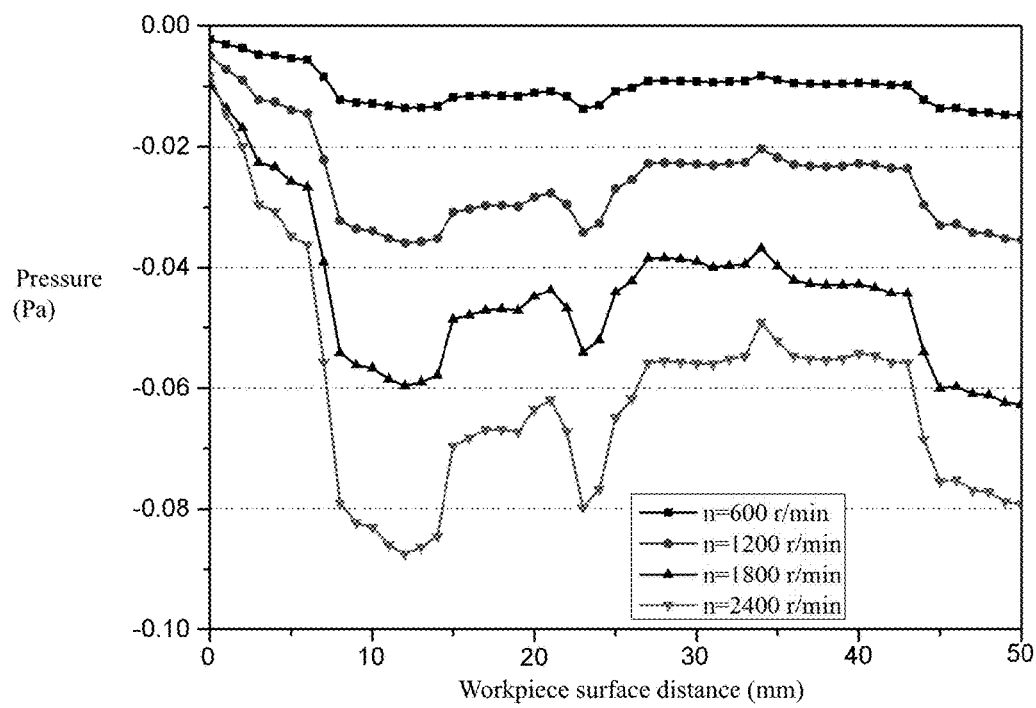
FIG. 23 is a graph of a pressure around a milling cutter at different speeds.

FIG. 22 is a graph of an air flow velocity around a milling cutter at different speeds. FIG. 23 is a graph of a pressure around a milling cutter at different speeds.

Referring to FIGS. 22 and 23, in order to quantitatively analyze the influence rule of the rotation speed on the speed of the air flow field around the milling cutter, the air flowing speeds and pressures around the milling cutter at different rotation speeds are respectively collected, and air flowing speed and pressure diagrams around the milling cutter at different rotation speeds are established. The horizontal coordinate is a length from the surface of the workpiece. It can be seen from the drawing that the air flowing speed changes periodically with the distance from the surface of the workpiece. The air flowing speeds on the surface of the milling cutter and at the chip discharge groove are different. When the distance from the surface of the workpiece is 30-40 mm, the air flowing speed is the smallest. According to the conservation principle of mechanical energy of Bernoulli fluid: if the speed is small, the pressure is large. The air flow enters the narrow milling groove from the periphery of the milling cutter, the pressure increases and the air flowing speed decreases. Among them, the air flowing speed around the surface of the milling cutter is relatively large, the air flowing speeds can respectively reach 0.62 m/s (n=600 r/min), 1.19 m/s (n=1200 r/min), 1.85 m/s (n=1800 r/min) and 2.49 m/s (n=2400 r/min). It can be seen that with the increase of the rotation speed, the influence of the milling cutter on the airflow field speed around the milling cutter becomes more and more obvious. The airflow field speed around the milling cutter linearly increases with the rotation speed of the milling cutter. It means that, the improvement of the rotation speed can continuously expand the radius of the air barrier around the milling cutter, increase the difficulty of the cutting fluid reaching the interface of milling cutter/chip and milling cutter/workpiece interface, and reduce the cooling and lubricating effect.

It can be seen from FIG. 23 that the air pressures around the milling cutter are all negative pressures, and the negative pressure increases with the increase of the rotation speed of the milling cutter, and their maximum values can reach −0.015 Pa (n=600 r/min), −0.035 Pa (n=1200 r/min), −0.062 Pa (n=1800 r/min), −0.089 Pa (n=2400 r/min). With the increase of the negative pressure around the milling cutter, the pressure difference of the incoming flow increases, which is more conducive to the cutting fluid reaching the radial flow along with the incoming flow and then further being transported to the milling cutter/workpiece interface. Therefore, when the position of the nozzle is in the incoming flow field, with the increase of the rotation speed of the milling cutter, the more obvious the effect of the airflow field on the transportation of the cutting fluid is, the higher the effective utilization rate of the cutting fluid is.

Figure 24:
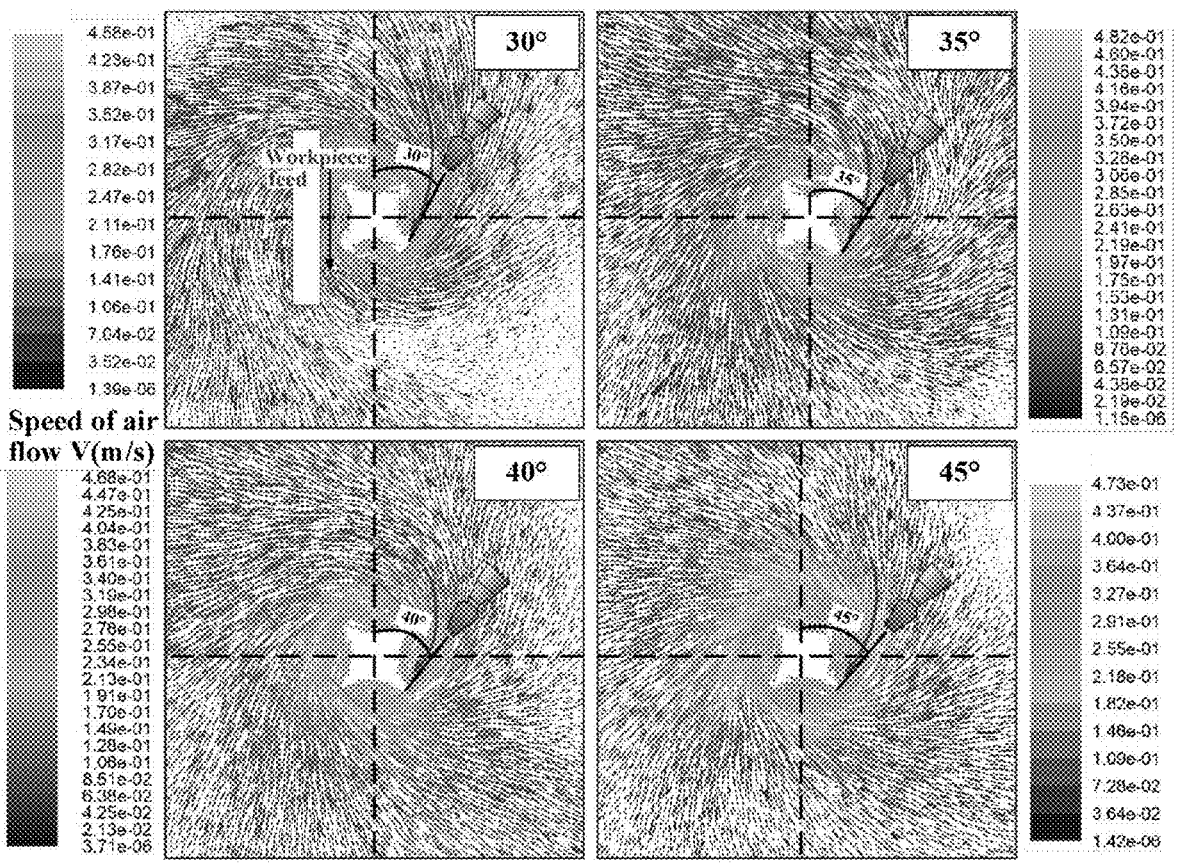
FIG. 24 is a flow line diagram of an air flow field having a Z=20 mm section under milling cutters having different spiral angles.
Figure 25:
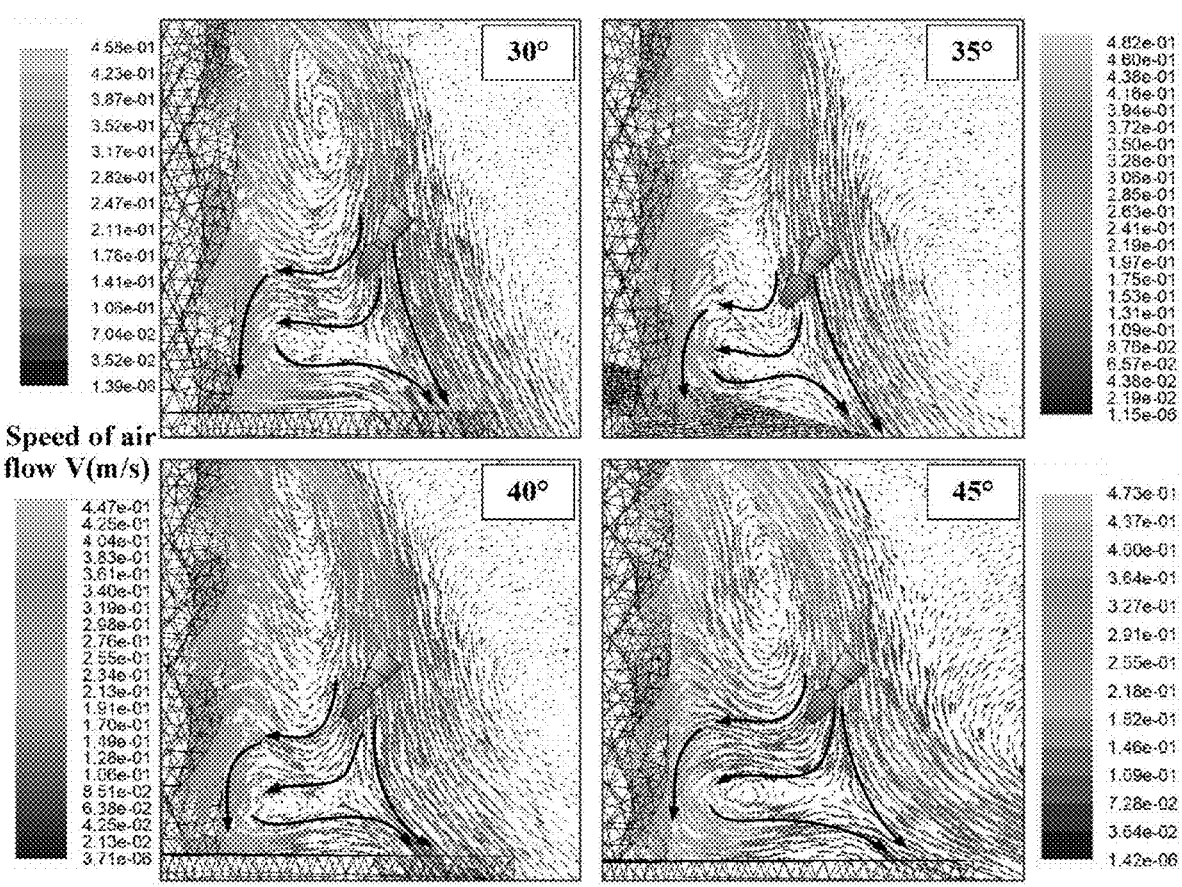
FIG. 25 is a flow line diagram of an air flow field having an optimal jet angle section under milling cutters having different spiral angles.

FIG. 24 is a flow line diagram of an airflow field having a Z=20 mm section under milling cutters having different spiral angles. FIG. 25 is a flow line diagram of an airflow field having an optimal jet flow angle section under milling cutters having different spiral angles.

Referring to FIG. 24 and FIG. 25, the helical angle of the milling cutter can also affect the air flow field in the milling area. Therefore, under the condition that the diameter, the rotation speed and other parameters of the cutter are kept unchanged, the helical angles of the milling cutter are changed to 30°, 35°, 40° and 45° respectively, and the change of airflow field is observed. It can be seen that the direction of the circumferential flow varies with the change of the helical angle of the milling cutter, that is, the optimal angle between the nozzle and the milling cutter feeding direction changes. It can be seen from the drawing that when the angle between the nozzle and the milling cutter feeding direction is the same as the helical angle of the milling cutter, the air flow field can assist in the transportation of the cutting fluid, which is conducive to injecting the cutting fluid into the milling cutter/workpiece interface and increasing the effective utilization rate of the cutting fluid. According to FIG. 25, it can be seen that when the angle between the nozzle and the milling cutter feeding direction is the same as the helical angle, the air flow fields formed by the milling cutter rotating at different helical angles have little difference. According to the measurement, the optimal target distance should be within 20 mm, and the optimal angle between the nozzle and the surface of the workpiece is the same, when they are both 40°-50°, it is most conducive to the transportation of the cutting fluid, so as to achieve the high utilization rate of the cutting fluid.

Figure 26:
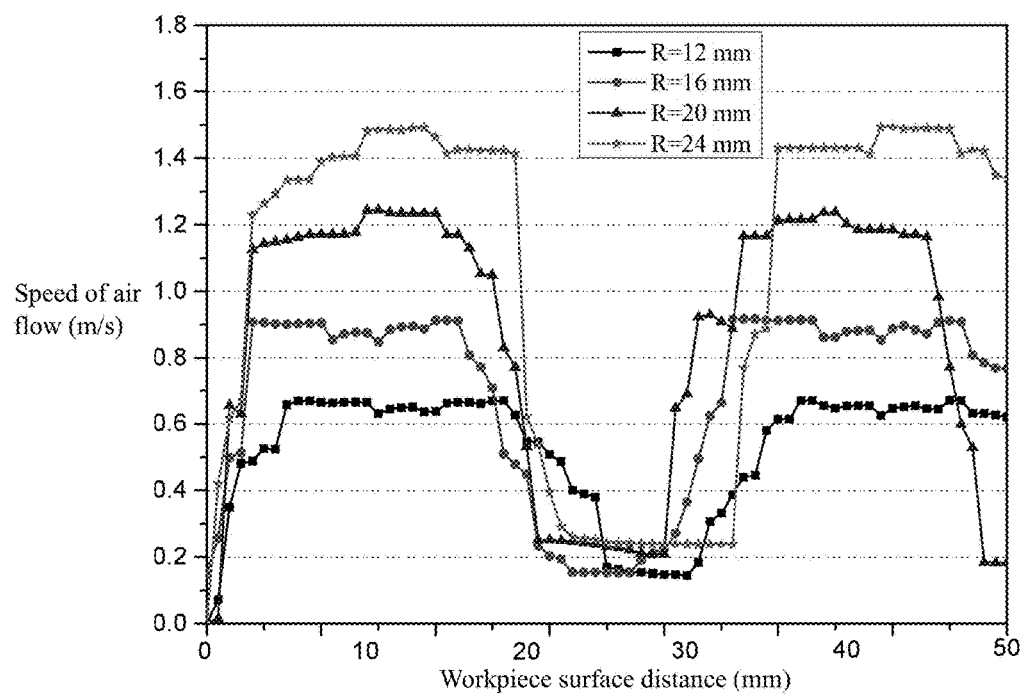
FIG. 26 is a flow line diagram of an air flow field having Z=20 mm section under different milling cutter diameters.
Figure 27:
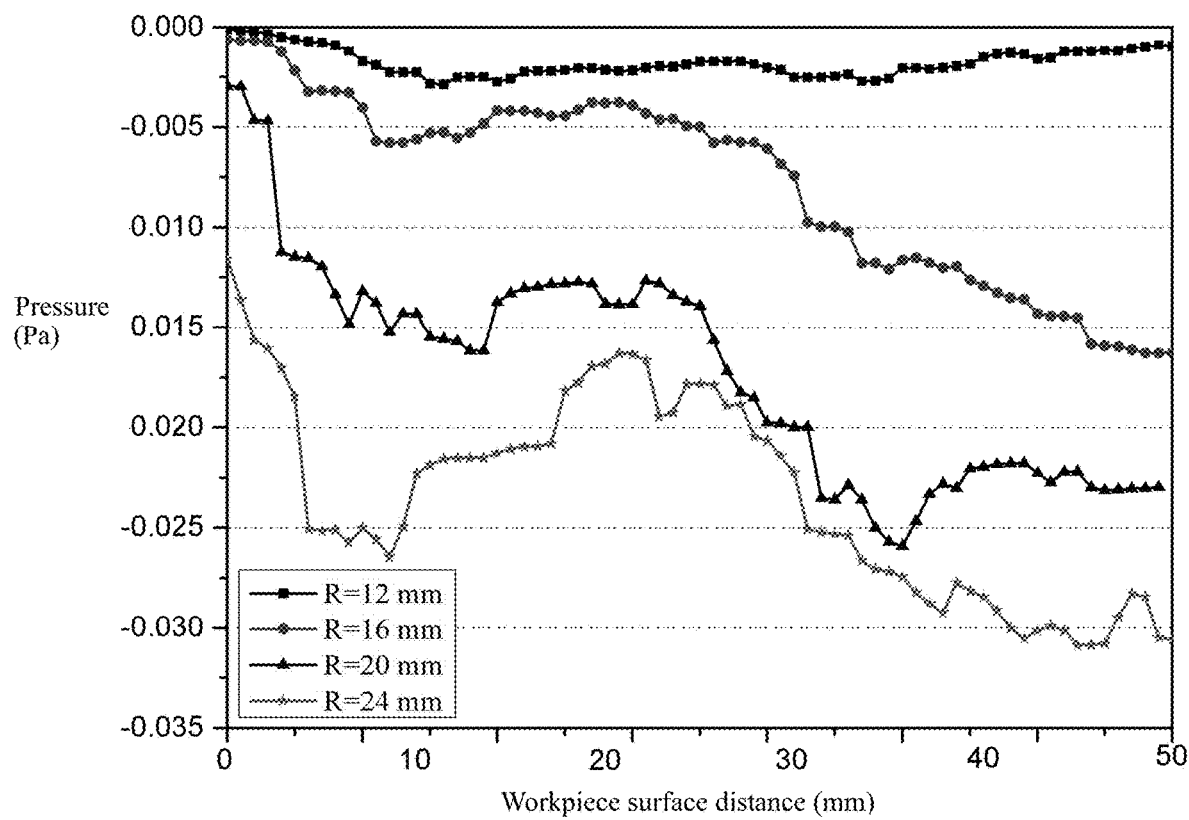
FIG. 27 is a flow line diagram of an air flow field having 30° section under different milling cutter diameters.

FIG. 26 is a flow line diagram of an air flow field having Z=20 mm section under different milling cutter diameters. FIG. 27 is a flow line diagram of an air flow field having 30° section under different milling cutter diameters.

Referring to FIGS. 26-27, the diameter of the milling cutter can also affect the air flow field in the milling area. Therefore, under the condition that the helical angle, rotation speed and other parameters of the milling cutter are kept unchanged, the diameter of the milling cutter is changed respectively to 12 mm, 16 mm, 20 mm and 24 mm, and the influence of the diameter of the milling cutter on the airflow field is observed. In order to quantitatively analyze the influence rule of the diameter of the milling cutter on the constraint interface of the end face milling cutter, the air flowing speeds and pressures around the milling cutters having different diameters are respectively collected, and graphs of air flowing speeds and pressures around the milling cutters having different diameters are established. It can be seen that the air flowing speed around the milling cutter increases with the increase of the diameter of the milling cutter, wherein, the air flowing speeds are respectively 0.62 m/s (R=12 mm), 0.91 m/s (R=16 mm), 1.22 m/s (R=20 mm) and 1.49 m/s (R=24 mm). This is mainly because the diameter of the cutter is increased to result in increase of the linear speed on the surface of the cutter, the milling cutter drives the increase of the air flowing speed around the milling cutter. When the distance from the surface of the workpiece is 20-35 mm, the air flow speed decreases and is the lowest, this is because it is located in the chip chute at this moment, the pressure increases after the air flow enters the narrow chip chute, according to Bernoulli's conservation principle of fluid mechanical energy, the pressure increases and the speed decreases. Change in pressures is further observed. It can be seen that the pressures around the milling cutter are negative, and the negative pressure increases as the diameter increases, and the maximum negative pressure value can reach −0.032 Pa (R=12 mm), −0.026 Pa (R=16 mm), −0.016 Pa (R=20 mm), −0.003 Pa (R=24 mm), respectively. With the increase of the negative pressure around the milling cutter, the pressure difference of the incoming flow increases, which is more conducive to the cutting fluid reaching the radial flow along with the incoming flow and then further being transported to the milling cutter/workpiece interface. Therefore, when it is ensured that the position of the nozzle is in the incoming flow field, the airflow field has a more obvious effect on the transportation of the cutting fluid is more obvious as the diameter of the milling cutter increases.

To sum up, the position of the nozzle is set by analyzing the flow field in the milling area. Under the constraint conditions of the end face milling cutter, the airflow field around the rotary milling cutter mainly includes the circumferential flow, the incoming flow, the radial flow, the return flow and the air barrier layer. According to the complex flow field around the rotary milling cutter, the optimal position (the angle between the nozzle and the milling cutter feeding direction, and the angle and target distance between the nozzle and the surface of the workpiece) of the nozzle can be determined. When the nozzle is along circumferential flow and in the incoming flow, the flow field can play a role in auxiliary transportation of the injection of the cutting fluid, thereby increasing the effective utilization rate of the cutting fluid.

The optimal position of the nozzle varies with the change of the helical angle and rotation speed of the milling cutter. The angle between the nozzle and the milling cutter feeding direction is related to the helical angle of the milling cutter. When this angle is the same as the helical angle, it is most conducive to the incoming of the cutting fluid. The target distance of the nozzle is related to the rotation speed of the milling cutter. The diameter of the milling cutter does not affect the position of the nozzle. When the rotation speeds of the milling cutter are 600 r/min and 1200 r/min, the optimal target distance is 30 mm. When the rotation speeds of the milling cutter are 1800 r/min and 2400 r/min, the optimal target distance is 20 mm, the angle between the nozzle and the surface of the workpiece does not change, and the effect is best when this angle is 40°-50°.

The above descriptions are only preferred embodiments of this application but are not intended to limit this application. For those skilled in the art, various variations and changes can be made to this application. Any modifications, equivalent replacements, improvements and the like made within the spirit and principle of this application should be included in the scope of protection of this application.

Although embodiments of the disclosure are described in combination with accompanying drawings, the scope of protection of the disclosure is not limited. Those skilled in the art that should understand that on the basis of the technical solution of the disclosure, various modifications or deformations made by those skilled in the art without any creative efforts still fall within the scope of protection of the disclosure.

We claim:

1. A system for injecting cutting fluid during milling under different working conditions, the system comprising a lubricating system, a magazine system, a cutter change system, a cutting system, and a force measurement system, wherein:

the magazine system comprises a storage magazine on which a plurality of cutter assemblies are circumferentially distributed, each cutter assembly of the plurality of cutter assemblies being provided with a respective mandrel and a respective cutter which is connected with a first end of the associated mandrel, and helical angles of various cutters of the plurality of cutter assemblies are not identical, and the plurality of cutter assemblies are indexed through rotation of the storage magazine to tool change positions, the cutter change system comprises two mechanical are which extend outward in opposite directions from a rotation shaft arranged in the middle of the two mechanical arms, wherein switching of the positions of the two mechanical arms is achieved by controlling rotation of the rotation shaft, and cutter assembly change between the cutting system and the magazine system is realized through switching of the positions of the two mechanical arms;

the cutting system comprises a spindle having arranged thereon a given cutter assembly of the plurality of cutter assemblies, and rotation of the cutter arranged on the cutting system is driven by controlling the rotation of the associated mandrel to which the cutter arranged on the spindle is connected, wherein cutting is achieved through rotation of the cutter;

the force measurement system is arranged under the cutting system, when a cutting force is applied to a workpiece fixed on the force measurement system, the cutting force applied to the workpiece is measured, and the various cutters having non-identical helical angles are selected for milling according to processing parameters;

the lubricating system comprises a gas inlet interface, a gas source processor, a lubricating pump, a nozzle pipe, a nozzle, connection pipelines, and control valves arranged at various ones of the connection pipelines, the gas inlet interface is fixed on the gas source processor, high-pressure gas enters the gas source processor via the gas source processor for filtration to provide the high-pressure gas for the lubricating system, the gas source processor is connected to a solenoid valve through a dual-direction joint to control the incoming of the high-pressure gas, an outlet of the solenoid valve is connected with a tee, the high-pressure gas enters a frequency generator via one outlet pipeline of the tee, an input frequency of the high-pressure gas is controlled through the frequency generator, the high-pressure gas enters the lubricating pump after coming out of the frequency generator, and an output joint of the lubricating pump is connected with a joint of the nozzle to provide the lubricating oil for the cutting system;

the high-pressure gas enters the lubricating pump through another outlet pipeline of the tee, one end of the joint of an oil cup is in threaded connection, another end is in threaded connection with a lubricating pump fixing cover, the lubricating pump fixing cover is connected with the lubricating pump, the lubricating pump fixing cover is fixed on a box body, a quantity of the high-pressure gas is adjusted by adjusting a gas quantity adjustment knob, and a quantity of the lubricating oil is adjusted by adjusting an oil quantity adjustment knob;

the lubricating system provides the lubricating oil to the cutting system, a power source of the lubricating system is the high-pressure gas, the input frequency and the quantity of the high-pressure gas are respectively controlled by the frequency generator and the gas quantity adjustment knob, the quantity of the lubricating oil in the lubricating pump is indirectly adjusted, and the lubricating oil provided by the lubricating system is sprayed to the milling area acted on by the cutting system through the connection pipelines, the nozzle pipe, and the nozzle, wherein the position of the nozzle is adjusted depending on a difference in flow fields of the milling area and the helical angles and rotation speeds of the various cutters under different working conditions.

2. The system for injecting cutting fluid during milling under different working conditions according to claim 1, wherein:

the force measurement system comprises a workbench, a workpiece holder, and a measurement element, the workbench is arranged right under the cutting system, the workpiece holder is fixed on the workbench, and complete positioning is achieved through the workpiece holder and the workbench by utilizing the freedom of the workpiece, the measurement element collects the cutting force applied to the workpiece, and a measurement signal is amplified by an amplifier to be transferred to an information collection instrument, and then conducted to a computer via a wire to display the cutting force;

the workpiece holder comprises an X-axis direction clamping element, a Y-axis direction clamping element, and a Z-axis direction clamping element, the X-axis direction clamping element comprises a plurality of positioning screws, the Y axis direction clamping element comprises fastening screws and a positioning block, one face of the positioning block contacts with a side of the workpiece, another face of the positioning block contacts with the fastening screws, and the fastening screws are tightly screwed so that the positioning block is clamped against the workpiece; the Z-axis direction clamping element comprises a plurality of pressing plates for clamping, each pressing plate of the plurality of pressing plates being a self-adjusting pressing plate, and adjustment of equipment for meeting a requirement in change in size of the workpiece is achieved according to the size of the workpiece through adjustment of the X-axis direction, Y-axis direction, and Z-axis direction clamping elements.

\* \* \* \* \*